United States Patent [19]
Hunter

[11] Patent Number: 5,949,608
[45] Date of Patent: *Sep. 7, 1999

[54] TIME DEPENDENT VELOCITY-CONTROLLED DISK DRIVE ACTUATOR SYSTEM

[75] Inventor: Dan A. Hunter, Boulder, Colo.

[73] Assignee: Mobile Storage Technology Inc., Boulder, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/659,204

[22] Filed: Jun. 5, 1996

[51] Int. Cl.$^6$ .................................................. G11B 5/596
[52] U.S. Cl. .................................... 360/78.09; 360/78.06
[58] Field of Search .................................. 369/32, 44.28, 369/44.29; 360/78.09, 78.07, 77.04, 77.01, 73.08, 73.05, 73.01, 78.06

[56] References Cited

U.S. PATENT DOCUMENTS

| | | | |
|---|---|---|---|
| 5,182,684 | 1/1993 | Thomas et al. | 360/78.09 |
| 5,369,345 | 11/1994 | Phan et al. | 360/78.09 |
| 5,404,253 | 4/1995 | Painter | 360/78.09 |
| 5,465,035 | 11/1995 | Scaramuzzo, Jr. et al. | 360/78.09 |
| 5,469,414 | 11/1995 | Okamura | 360/78.09 |
| 5,483,438 | 1/1996 | Nishimura | 360/78.09 |
| 5,539,592 | 7/1996 | Banks et al. | 360/78.09 |
| 5,585,976 | 12/1996 | Pham | 360/78.09 |
| 5,646,797 | 7/1997 | Kadlec et al. | 360/78.09 |

*Primary Examiner*—Nabil Hindi
*Attorney, Agent, or Firm*—Skjerven, Morrill, MacPherson, Franklin & Friel LLP; David W. Heid

[57] ABSTRACT

A velocity-controlled actuator system and method are usable in low velocity, high load situations such as those encountered in dynamic head loading, and in normal situations. The velocity-controlled actuator system utilizes a self-tuning estimator that is calibrated during operation of said disk drive. Consequently, parameters, characteristics, and any other features of the disk drive that affect operation of the actuator system are compensated for in real time by the calibration process. The velocity-controlled actuator system dynamically adjusts the actuator resistance utilized in the reconstruction of the back EMF voltage by utilizing a self-tuning estimate of the actuator resistance that compensates for any changes in the actuator resistance over time.

5 Claims, 14 Drawing Sheets

TIME DEPENDENT VELOCITY-CONTROLLED DISK DRIVE ACTUATOR SYSTEM

RELATED APPLICATION

This application is related to commonly filed and commonly assigned U.S. patent application Ser. No. 08/658,772, entitled "A Method for Precise Velocity Feedback Control in An Actuator System of a Disk Drive", filed on Jun. 5, 1996, now abandoned.

FIELD OF THE INVENTION

This invention relates generally to actuator velocity control in a disk drive and in particular to reconstructing a back EMF voltage in a velocity feedback loop so that the time dependent characteristics of the back EMF voltage are accurately captured.

DESCRIPTION OF RELATED ART

As high performance computers have become smaller the disk drive industry has introduced 2.5 inch and 1.8 inch disk drive footprints. These small form factor disk drives are suitable for use in laptop computers and personal digital assistants. The introduction of the smaller footprint disk drives require the disk drive mechanics to be redesigned to overcome new problems related to the reduced actuator size and inertia. Simultaneously, storage capacities have increased for these small footprint drives through the introduction of new read/write processes and reduced head flying height.

To minimize the head flying height one of the latest trends is to utilize non-textured media. Unfortunately, with this type of media there can be severe stiction problems for contact start/stop disk drives problem. One way to eliminate the severe stiction problems is to utilize dynamic head loading onto the media.

To successfully utilize dynamic head loading in the small footprint disk drives, the heads must be loaded and unloaded without contacting and damaging the media. Consequently, the load and unload velocities of the heads must be low and precisely controlled. Because the heads are not flying over the media during the load operation, there is no sensory feedback signal from the heads that can be used to control the velocity.

One prior art technique used to control the velocity of the heads was to utilize the actuator back-EMF voltage Vbemf(t) as a feedback signal. The two main obstacles associated with utilizing actuator back EMF voltage Vbemf(t) as the load/unload velocity feedback signals are that (i) the back EMF voltage is not directly observable, and (ii) for low velocities and small torque constant actuators, the back EMF voltage is very small.

The reconstruction of the back EMF voltage for actuator velocity control is well known within the disk drive industry. One of the problems with the techniques currently used for reconstruction of the back EMF voltage is that the actuator resistance Ract is assumed to be well-known, and that the load disturbances are assumed negligible. Unfortunately, for disk drives that utilize dynamic head loading, the assumption that the load disturbances are negligible is not particularly good.

Further, the values of the actuator parameters used in the back EMF reconstruction vary due to manufacturing tolerances, temperature, and age. If these variations are not taken into consideration, the reconstruction of the back EMF voltage is not robust.

Similarly, any error in reconstructing the back EMF voltage is amplified because at low velocities, the small amplitude back EMF signal is multiplied by a gain factor to create a usable feedback signal. This physical process is illustrated in more detail in FIG. 1. Actuator input voltage Vact is supplied on line 10 to a positive summing terminal of junction 30. Actuator current iact on line 20 is multiplied by actuator resistance Ract and the result is applied to the negative terminal of summing junction 30. The output signal of the summing junction 30 is the back EMF voltage Vbemf. This signal is amplified by a constant gain K in unit 40 to generate a feedback signal that can be used in the velocity controlled actuator system.

To specifically understand the prior art velocity control actuator and systems consider the electrical and mechanical characteristics of the actuator as given by expressions (1) and (2) below.

$$Vact(t) = Ract(t) * iact(t) + Lact * \frac{d\,iact(t)}{dt} \quad (1)$$

where

Vact(t)=voltage as a function of time;

Ract(t)=actuator resistances as a function of time;

iact(t)=actuator element as a function of time;

Lact=actuator inductance; and $$\frac{d}{dt} = \text{differential with respect to time.}$$

$$Jact\frac{d\omega(t)}{dt} = Tact(t) - Tload(t) - Bact * \omega(t)$$

where

Jact=actuator inertia;

ω(t)=actuator angular velocity as a function of time;

Tact(t)=actuator torque as a function of time;

Tload(t)=actuator load torque as a function of time; and

Bact=viscous frictional force.

Expressions (1) and (2) are general approximations that can be used in any velocity-controlled actuator system. However, for small form factor disk drives, the actuator characteristics play a different role than those in the larger footprint disk drives. The physical size of the actuator assembly in the small form factor disk drives limits the number of windings that can be used as well as the size of the magnet. These constraints result in an actuator that has a small torque constant Kt and a small actuator inductance Lact. Consequently, actuator resistance Ract is very much greater than actuator inductance Lact. For this condition, the second term on the right hand side of expression 1 is negligible with respect to the first term and so to a high degree of approximation the actuator voltage is given by expression (3).

$$Vact(t)=Ract(t)*iact(t) \quad (3)$$

Another consequence of the small actuator size is at the viscous frictional coefficient Bact is very much smaller than inertia Jact. Consequently the third term on the right hand side of equation (2) is also negligible for the small footprint disk drives and expression (2) becomes:

$$Jact \frac{d\omega(t)}{dt} = Tact(t) - Tload(t) \qquad (4)$$

To utilize the back EMF voltage Vbemf for velocity feedback in a velocity control and actuator system that implements expressions (3) and (4), recall that the relationship between the back EMF voltage Vbemf(t) and the angular velocity ω(t) of the actuator is given by:

$$\omega(t) = (1/Kb) * Vbemf(t) \qquad (5)$$

To further verify the basis for a velocity-controlled actuator system, consider the relationship between the actuator voltage Vact(t), the actuator current iact(t), actuator resistance Ract and back EMF voltage Vbemf(t) (FIG. 2) which is given by:

$$Vbemf(t) = Vact(t) - (Ract(t) * iact(t)) \qquad (6)$$

Combining equations (5) and (6) yields an expression for angular velocity ω(t) which is:

$$\omega(t) = (1/Kb)(Vact(t) - (Ract(t) * iact(t))) \qquad (7)$$

FIG. 3 is a diagram of a velocity-controlled actuator system that implements expression (3) for the velocity controlled actuator system voltage signal and expression (5) for the velocity feedback signal. In FIG. 3 there are three feedback loops: a physical back EMF voltage feedback loop 310; an actuator current feedback loop 320; and a velocity feedback loop 330.

In this velocity-controlled actuator system, a reference input voltage ωref is applied to the positive terminal of summing junction 301. The output signal of velocity feedback loop 330 is applied to the negative input terminal of summing junction 301. The output signal from summing junction 301 drives a first transfer function G1(s) which in turn drives the positive input terminal of a second summing junction 302. Typically, transfer function G1(s) is utilized to control the closed loop characteristics of the velocity feedback loop.

The negative input terminal of summing junction 302 is driven by the output signal of current feedback loop 320. The output signal from summing junction 302 drives a second transfer function G2(s). Typically, transfer function G2(s) is utilized to control the closed loop characteristics of the current feedback loop. The output signal from transfer function G2(s) drives the positive input terminal of summing junction 303 and a positive input terminal of a summing junction 304 in velocity feedback loop 330.

The output signal from second transfer function G2(s) is actuator voltage Vact(t). The physical back EMF voltage from back EMF voltage feedback loop 310 drives the negative input terminal of summing junction 303. The output signal of summing junction 303 is divided by the actuator resistance Ract in unit 305 to generate the actuator current iact(t).

Actuator current iact(t) drives feedback transfer function H2(s) in current feedback loop 320 and the output signal from transfer function H2(s) is the signal on the negative input terminal of summing junction 302. Actuator current iact(t) also drives unit 306 which multiplies the actuator current by torque constant gain Kt and to obtain a signal representing actuator torque Tact. In addition, actuator current iact(t) drives unit 331 in feedback loop 330.

The actuator torque signal is applied to a positive input terminal of summing junction 307. The actuator load torque signal is applied to the negative terminal of summing junction 307 so that the output signal of summing junction 307 is the difference between the two torques.

The signal representing the difference between the two torques is divided by the product of the actuator inertia Jact and the Laplace transform variable s in unit 308 to generate angular velocity ω(t). Angular velocity ω(t) is multiplied by back EMF gain Kb in unit 311 to generate the back EMF voltage Vbemf that is applied to the negative terminal of summing junction 303. Thus, feedback loop 310 implements expression (5). Also, in unit 309, angular velocity ω(t) is divided by the Laplace transform variable s, i.e., integrated, to obtain angular position signal θ. As is known to those skilled in the art, junctions 303 and 307 and units 305, 306, 308, 309 and 311 are a representation of the physical operation of the actuator.

Unit 331 in feedback loop 330 multiplies actuator current iact(t) by estimated actuator resistance $R_{EQ}$ to generate a signal that is applied to a negative input terminal of summing junction 304. As indicated above, the positive terminal of summing junction 304 is driven by the actuator voltage Vact. The output signal of summing junction 305 is divided by back EMF gain Kb in unit 332 to generate reconstructed angular velocity ω'(t). Thus, feedback loop 330 implements expression (7). Angular velocity ω'(t) is processed by transfer function H1(s) in unit 333 and the resulting signal is applied to the negative input terminal of summing junction 301.

Velocity controlled actuator system 330 requires the variables and constants on the right hand side of expressions (3) to (7). In the prior art applications, actuator current iact(t) and actuator voltage Vact(i) are observable. However, actuator resistance Ract and back EMF gain Kb are assumed known and constant. If SI units are used in the velocity controlled actuator system 330, the values of back EMF gain Kb and torque constant gain Kt are identical. Since torque constant gain Kt can be measured, back EMF gain Kb is experimentally known.

FIG. 4 is one embodiment of a prior art velocity-controlled actuator system that utilized a back EMF voltage. An input voltage from a digital-to-analog converter DAC ($V_{IN}$) is connected to a negative input terminal of an operational amplifier 410 through a five Kohm resistor 401. The negative input terminal is also connected to an input reference voltage VR1 through a series combination of a five Kohm resistor 402 and a one ohm resistor 404.

A positive input terminal of operational amplifier 410 is connected to reference input voltage VR1 through a five Kohm resistor 403. Also, a reconstructed back EMF voltage TACH from operational amplifier 420 is applied to the positive input terminal of operational amplifier 410 through a five Kohm resistor 421. The output signal of operational amplifier 410 is actuator voltage ACT−. Actuator voltage ACT+ is taken from the connection between resistor 404 and resistor 402.

Reconstructed back EMF voltage TACH is generated using actuator voltages ACT+ and ACT−. Actuator voltage ACT+ is applied to a positive input terminal of operational amplifier 420. Actuator voltage ACT− is applied to a negative input terminal of operational amplifier 420 through five Kohm resistor 423. Reference voltage VR1 is applied to the negative input terminal of operational amplifier 420 through a variable resistance REQ.

The assumption for circuit 400 is that the actuator resistance Ract is a constant and approximated by calibrating variable resistance $R_{EQ}$. Thus, the reconstructed back EMF voltage is approximated by:

$$V_{bemf}(t)=V_{act}(t)-(R_{EQ}*i_{act}(t)) \quad (8)$$

or in terms of circuit 400

$$TACH=5(V_{act}-(5/R_{EQ})*i_{act}) \quad (9)$$

for 4.5<Ract<6,
Ract=(5/REQ), and
Vact=(ACT+)–(ACT–)

Variable resistance REQ was adjusted with the three switches so that Ract was estimated to within 0.50 ohms. Specifically, to calibrate resistance $R_{EQ}$, a current of 100 mA was output across the actuator. The switches in resistance $R_{EQ}$ were then toggled until signal TACH was approximately zero. During loading in dynamic head loading, this calibration and reconstruction of the back EMF voltage was adequate. However, for low velocity motion where the gain of the circuit that generates signal TACH is large, this circuit fails.

Specifically, assume that variable resistance $R_{EQ}$ is:

$$R_{EQ}=R_{act}+R\delta \quad (10)$$

where Rδ is the resistance error in assuming the actuator resistance is a constant. The reconstructed back EMF voltage Vbest(t) is:

$$V_{best}(t)=V_{act}(t)-((R_{act}+R\delta)*i_{act}(t))$$

or $$V_{best}(t)=(V_{act}(t)-R_{act}*i_{act}(t))-R\delta*i_{act}(t)$$

$$V_{best}(t)=V_{bemf}(t)-R\delta*i_{act}(t) \quad (11)$$

Thus, when resistance error Rδ is approximately zero, in expression (11), reconstructed back EMF voltage Vbest(t) is a good estimator of back EMF voltage Vbemf(t). However, an examination of the 0.5 ohm calibration precision shows that resistance error Rδ is not approximately zero. For example, consider a disk drive for which:

ω=3 rad/sec;
Ract=10.5 Ω
REQ=10. Ω
Kb=20 mV/rad/sec.

FIG. 5 is a plot of reconstructed back EMF voltage Vbest(t) on the y-axis vs. actuator current on the x-axis. The solid line is the actual back EMF voltage, and the dotted line is reconstructed back EMF voltage Vbest(t).

Even though actuator resistance Ract is estimated to within five percent of the actual value, the reconstructed back EMF voltage Vbest(t) is grossly in error for large currents. For an actuator current iact greater than 120 mA, the direction of the actuator movement is estimated incorrectly. These large currents can be generated for low velocity, high load situations, such as when the disk drive heads are moving across the ramp in dynamic head loading. Consequently, prior art velocity-controlled actuator systems are not suitable for use in such situations. If the back EMF voltage is to be successfully utilized in these low velocity, high load situations, a new calibration method in conjunction with a new velocity-controlled actuator system is required.

SUMMARY OF THE INVENTION

According to the principles of this invention, a novel velocity-controlled actuator system and method overcome the shortcomings of prior art velocity-controlled actuator systems and so are usable in low velocity, high load situations such as those encountered in dynamic head loading as well as in normal situations. The velocity-controlled actuator system of this invention utilizes a self-tuning estimator, and the self-tuning estimator is calibrated during operation of said disk drive. Consequently, parameters, characteristics, and any other features of the disk drive that affect operation of the actuator system are compensated for in real time by the calibration process.

In one embodiment, the velocity-controlled actuator system of this invention dynamically adjusts the actuator resistance utilized in the reconstruction of the back EMF voltage. Specifically, the actuator resistance is not assumed constant, but rather the velocity-controlled actuator system utilizes a self-tuning estimate of the actuator resistance that compensates for any changes in the actuator resistance over time. In one embodiment, the self-tuning portion of the system is recalibrated prior to each dynamic head loading. Consequently, the actuator resistance utilized in reconstruction of the back EMF voltage for velocity control is based upon the actual parameters of the disk drive at the time of operation and not some constant pre-established values as in the prior art velocity-controlled actuator systems.

In addition to treating the actuator resistance as a function of time and not as a constant, the velocity-controlled actuator system of this invention generates a more precise representation of the actuator resistance, and consequently, a more precise estimate of the back EMF voltage than was previously possible with the prior art analog compensation methods.

According to the principles of this invention, an actuator control system includes a model following system. The model following system allows the actuator control system to utilize precise velocity feedback control both during abnormal operations where high load disturbances are encountered, and normal operations.

In a hard disk drive with an actuator control system, an actuator controller drives an actuator driver that in turn drives an actuator. The principles of this invention are applicable to any disk drive where during normal operating conditions of the actuator, the current feedback from the actuator provides, for example, damping and current limiting properties, but during abnormal operations, such as dynamic head loading, forces or other factors exist that make the prior art velocity-controlled actuator systems unreliable.

During operation of the disk drive, a model signal generator receives a drive signal, or signals that are applied to the actuator driver on a feedback line. The model signal generator processes this input signal and generates a modeled output signal. A model follower receives the drive signal or signals, and in response to the same, generates an error compensation output signal. The combination of the error compensation signal and the modeled output signal are used in feedback velocity control of the actuator system.

As an example, during normal operations, the modeled output signal from the model signal generator is an estimated angular velocity, an estimated actuator current, or both. During normal operations, the modeled signal and the actual signal follow each other and so the model follower generates an error compensation signal that is substantially zero.

However, during abnormal operations, the modeled output signal deviates from the desired signal. In this situation, the error signal from the model follower compensates for the abnormal operation. Consequently, the model follower corrects the error so that the velocity of actuator is precisely controlled during the abnormal operation.

In one embodiment, a disk drive microprocessor generates the output signal for the model follower utilizing a look-up table that represents a piece-wise linear representation of the error compensation signal. The number of points stored in the look-up table is a trade-off between the random-access memory used to store the table, and the processing power of the disk drive microprocessor. If the disk drive microprocessor can rapidly perform a look-up and a linear interpolation, the number of points stored in the table is typically less than ten and, in one embodiment, is five.

DETAILED DESCRIPTION

Figure 1:
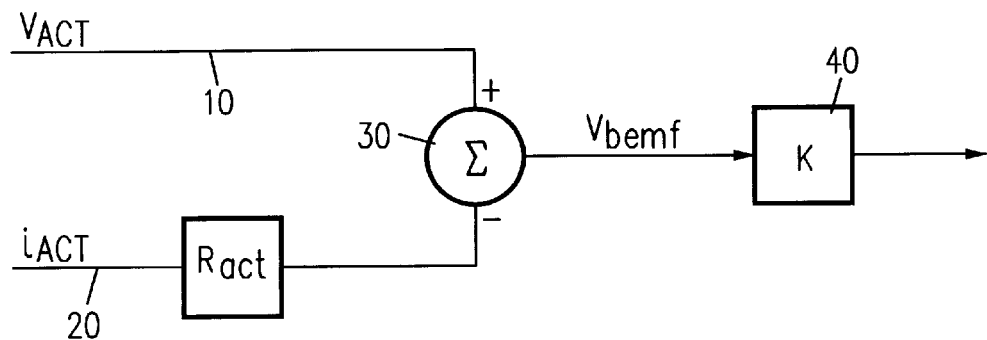
FIG. 1 is a representation of a prior art method to generate a back EMF signal that demonstrates that errors in the back EMF signal are amplified.
Figure 2:
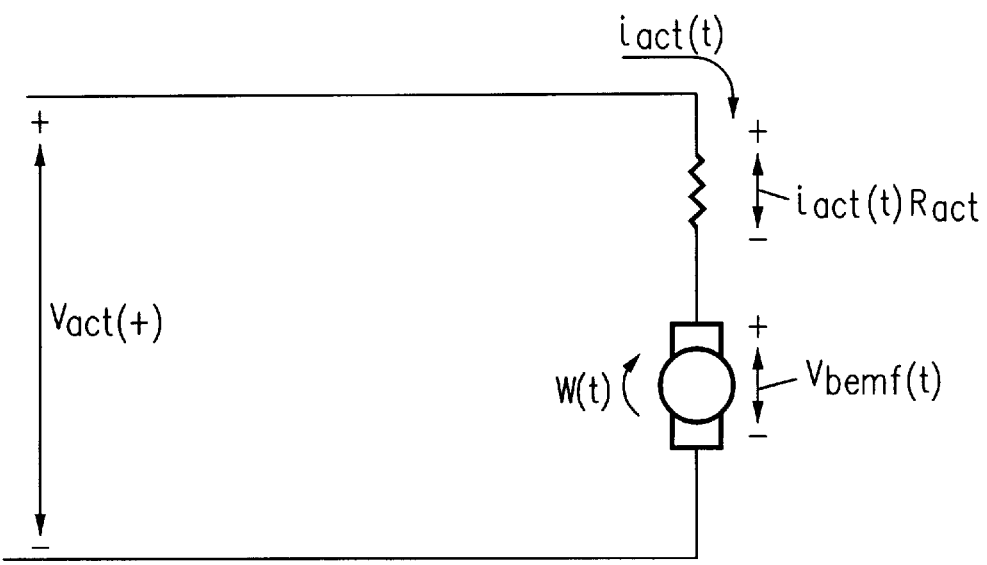
FIG. 2 illustrates the various factors that are used in the definition a back EMF voltage.

According to the principles of this invention, a novel velocity-controlled actuator system overcomes the shortcomings of prior art velocity-controlled actuator systems and so is usable in low velocity, high load situations such as those encountered in dynamic head loading. The velocity-controlled actuator system of this invention dynamically adjusts the actuator resistance utilized in the reconstruction of the back EMF voltage.

Specifically, the actuator resistance is not assumed constant, but rather the velocity-controlled actuator system utilizes a self-tuning estimate of the actuator resistance and so compensates for any changes in the actuator resistance over time. In one embodiment, the self-tuning portion of the system is recalibrated prior to each dynamic head loading. Consequently, the actuator resistance utilized in reconstruction of the back EMF voltage for velocity control is based upon the actual parameters of the disk drive at the time of operation and not some constant pre-established values as in the prior art velocity-controlled actuator systems.

In addition to treating the actuator resistance as a function of time and not as a constant, the velocity-controlled actuator system of this invention generates a more precise representation of the actuator resistance, and consequently, a more precise estimate of the back EMF voltage than was previously possible with the prior art analog compensation methods. Unlike the prior art system 300 that estimated the back EMF with velocity feedback loop 330, according to the principles of this invention, an actuator control system 650 includes a model following system 660. As explained more completely below, model following system 660 allows actuator control system 650 to utilize precise velocity feedback control both during abnormal operations where high load disturbances are encountered, and normal operations.

In hard disk drive 600 within actuator control system 650, an actuator controller 610 drives an actuator driver 601 that in turn drives actuator 602. Actuator 602 moves a transducer 604 over disk 603 during normal operations as well as loads and unloads transducer 604 from ramp 605 during abnormal operations.

Dynamic head loading as well as the operation of actuator controller 610, actuator driver 601, and related components within disk drive 600 are well-known to those skilled in the art. The particular configuration is not an important aspect of this invention. The principles of this invention are applicable to any disk drive where during normal operating conditions of actuator 602, the current feedback from actuator 602 provides, for example, damping and current limiting properties, but during abnormal operations, such as dynamic head loading, forces or other factors exist that make the prior art velocity-controlled actuator systems unreliable.

During operation of disk drive 600, model signal generator 661 receives a drive signal or signals that are applied to actuator driver 601. Model signal generator 661 processes this input signal and generates a modeled signal that is applied as an input signal to model follower 662. In addition to the modeled input signal, model follower 662 receives the actual signal from actuator 602.

The difference between the actual signal and the modeled signal, i.e., an error signal, represents the variation between the actual performance of actuator 602 and the modeled performance of actuator 602. Model follower 662, as described more completely below, processes the error signal and generates an error compensation signal to actuator controller 610.

As an example, during normal operations, the modeled signal from model signal generator 661 is an estimated angular velocity, an estimated actuator current, or both. During normal operations, the modeled signal and the actual signal received by model follower 662 follow each other and so model follower 662 generates an error compensation signal that is similar to that provided by prior art velocity-controlled feedback loop 300.

However, during abnormal operations, the modeled signal and the actual signal received by model follower 662 deviate from each other. In this situation, the error signal indicates to model follower 662 that an abnormal operation is in process. Consequently, model follower 662 corrects the error compensation signal based on the magnitude of the error signal so that the velocity of actuator 602 is precisely controlled during the abnormal operation.

The operations of model follower system 660 are significantly different from feedforward control used in some disk drives to compensate for runout. The feedforward control systems generated a large known signal in the actuator controller. The large known signal approximated the runout which in turn reduced the differential in the position error signal generated by the runout. With a smaller differential in the position error signal, the positioning of the transducer can be controlled more accurately. However, the sampling and other operations required for the feedforward runout compensation have an effect on the overall stability of the system. In contrast, model following system 660 simply detects external disturbances in the motion of actuator 602 and compensates for the external disturbances without effecting the overall stability of the system. This assumes that the measurements of the external disturbances are not in error. For example, sensor noise can effect the overall stability of model following system 660.

Figure 7:
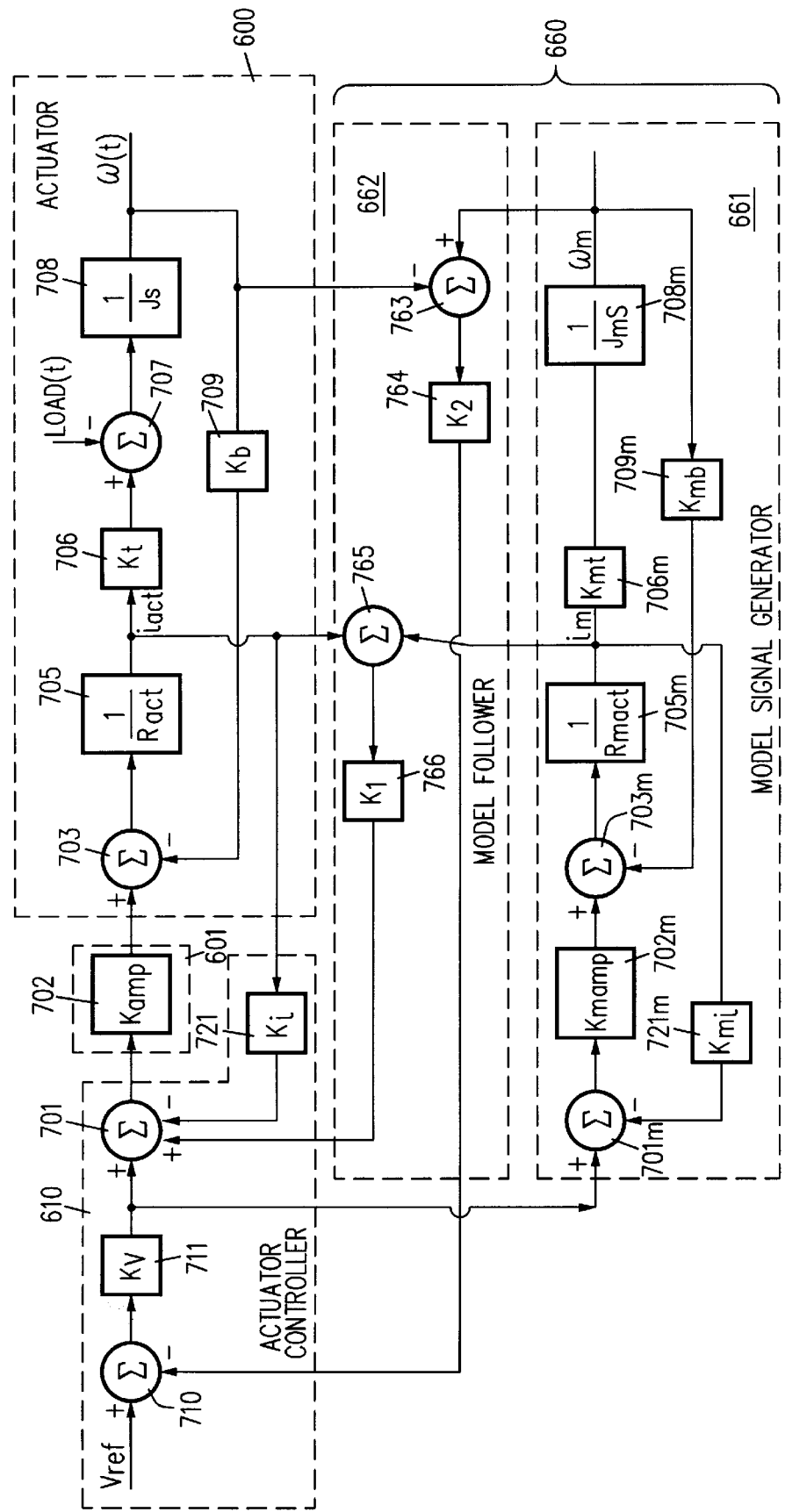
FIG. 7 is a more detailed diagram of one embodiment of the model signal generator and model follower of FIG. 6.

FIG. 7 is a more detailed diagram of model following system 660. In FIG. 7, only feedback current transfer function 721, which in this embodiment is gain Ki, summation junction 701, voltage transfer function 711 and summation junction 710 in actuator controller 610 are illustrated. Input signal Vref to summation junction 710 is generated by actuator controller 610 in a conventional fashion. Actuator driver 601 is represented in FIG. 7 as actuator amplification transfer function 702. Actuator 602 is represented by the various junctions and units illustrated in FIG. 7 that characterize the physical features of actuator 602. Specifically within actuator 602, junctions 603 and 607 and units 605, 606, 608, and 609 are similar to junctions 303 and 307 and units 305, 306, 308, and 309, respectively, and so the description of junctions 303 and 307 and units 305, 306, 308, and 309 above is incorporated herein by reference.

Model signal generator 661, in this embodiment, has a structure similar to that of the actual physical system. Specifically, the modelled junction or unit in model signal generator 661 has the same reference numeral as the corresponding junction or unit in the actual physical system followed by a "m" to represent "model". Thus, the output signal of voltage transfer function 711 is applied to the positive input terminal of summing junction 701 and of model summing junction 701m. Modeled actuator current drives unit 721m which adjusts actuator current im with gain Kmi and provides the resulting signal to the negative input terminal of model summing junction 701m.

In unit 702m, the output signal from modeled summing junction 701m is adjusted by model amplifier gain Kmamp and the resulting signal is applied to a positive input terminal of a second model summing junction 703m. A negative input terminal of summing junction receives the model back EMF voltage that is obtained by adjusting model angular velocity ωm by gain Kmb in unit 709m.

The output voltage from model summing junction 703m is a modeled actuator voltage that is divided by modeled actuator resistance Rmact in unit 705m to generate model actuator current im. In model unit 706m, modeled actuator current im is adjusted by modelled torque constant gain Kmt and the result is divided by Jms in unit 708m to generate model angular velocity ωm. Thus, in the embodiment, model signal generator 661 generates a model angular velocity ωm and a model actuator current im that are input signals to model follower 662.

Model follower 662 also receives as input signals the actual actuator current iact and angular velocity ω, where angular velocity ω is derived from an appropriate signal in the disk drive. The particular way used to generate a signal representing angular velocity ω is not an essential aspect of this invention. The only requirement is that the same representation is used in model signal generator 661 as in the disk drive itself. The following disclosure describes several ways to generate a signal representing angular velocity ω.

Summing junction 763 in model follower 662 receives modeled angular velocity ωm on a positive input terminal and actual angular velocity ω on a negative input terminal. Velocity error signal Δmω from summing junction 763 is the difference between the two angular velocities.

Velocity error signal Δmω is processed in unit 764 by a transfer function K2 that is one embodiment of a general transfer function G5(s). In one embodiment, transfer function K2 is a set of lookup tables for normal and abnormal operations. The magnitude of velocity error signal Δmω is used to select a table and a particular error compensation output signal from the table that is applied to summing junction 710.

Summing junction 765 in model follower 662 receives modeled actuator current im on a positive input terminal and actual actuator current iact on a negative input terminal. Current error signal Δim from summing junction 765 is the difference between the two currents.

Current error signal Δim is processed in unit 766 by a transfer function K1 that is one embodiment of a general transfer function G4(s). In one embodiment, transfer function K1 also is a set of lookup tables for abnormal and normal operations. The magnitude of the current error signal Δim is used to select table and a particular error compensation output signal from the table that is applied to summing junction 701.

Figure 8A:
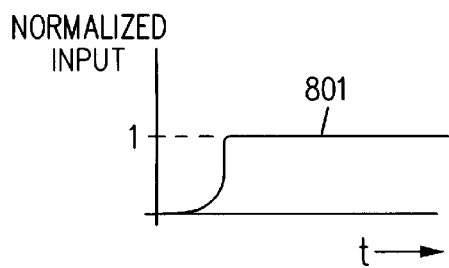
FIGS. 8A to 8H are signal traces that demonstrate the performance of a velocity controlled actuator system with and without the model follower of this invention.
Figure 8B:
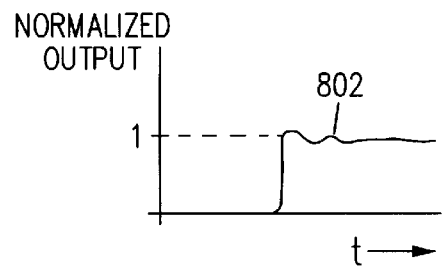

FIG. 8A illustrates a normalized input signal Vref, i.e., trace 801 to the actuator system. FIG. 8B is a desired normalized output signal 802 used to drive the actuator system. The control system for the actuator system has a position state as a function of time, e.g., trace 803 (FIG. 8C), and a velocity state as a function of time, e.g., trace 804 (FIG. 8D). Traces 803 and 804 in FIGS. 8C and 8D are generated using a back EMF control model, e.g., a model that implements traditional control laws.

Figure 8C:
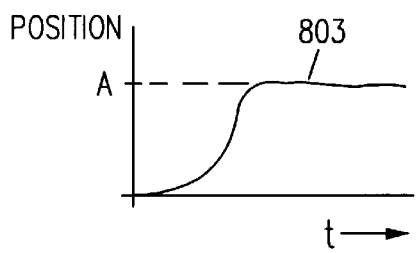
Figure 8D:
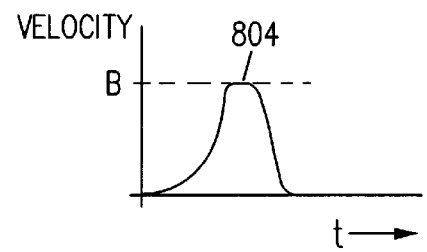
Figure 8E:
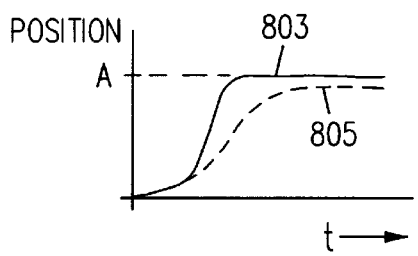
Figure 8F:
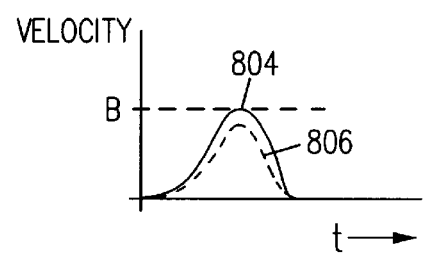
Figure 8G:
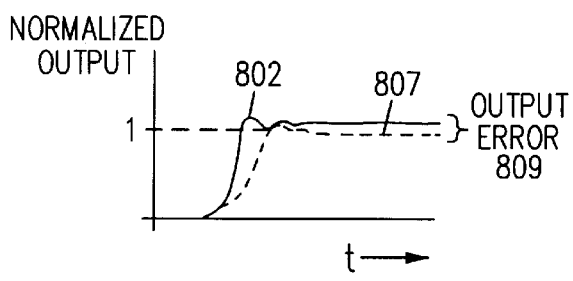
Figure 8H:
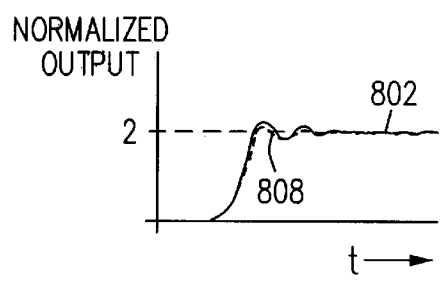

As explained above, in normal operation of the actuator system, the combination of the model states illustrated in FIGS. 8C and 8D results in desired output signal 802 as illustrated in FIG. 8B. However, when external disturbances act upon the actuator system, the modeled position and velocity states versus time of the actuator system are represented by trace 805 and trace 806, respectively, in FIGS. 8E and 8F. Also shown in FIGS. 8E and 8F are desired position trace 803 and desired velocity trace 804 that the models would preferably output in response to an external disturbance. FIG. 8G illustrates output error 809 in output signal 807 when only a model signal generator based upon conventional control laws is utilized in response to an external disturbance.

However, according to the principles of the invention, a model follower is utilized with the model signal generator. When external disturbances act, the model follower generates an output signal so that the desired position and desired velocity states are obtained when the signals from the model follower and model estimator are combined. Consequently, output signal 808 follows desired output signal 802 even when an external disturbance, e.g., a dynamic head loading, acts on the actuator system. Thus, the addition of the model follower either eliminates or greatly reduces the error in the output signal obtained with only the model signal generator.

Figure 3:
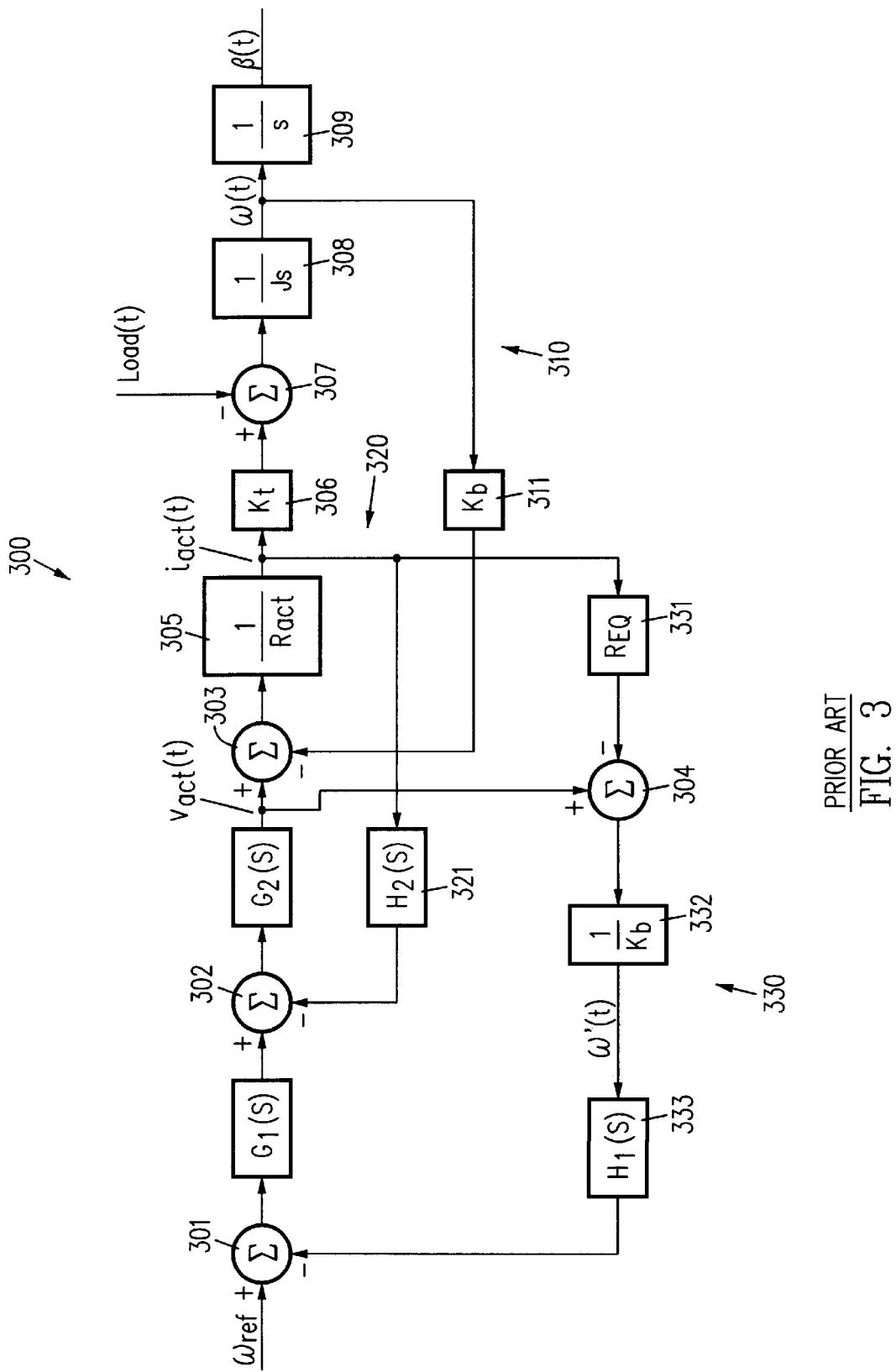
FIG. 3 is a diagram of a prior art velocity-controlled actuator system that includes both a physical velocity feedback loop and a modeled velocity feedback loop.
Figure 9:
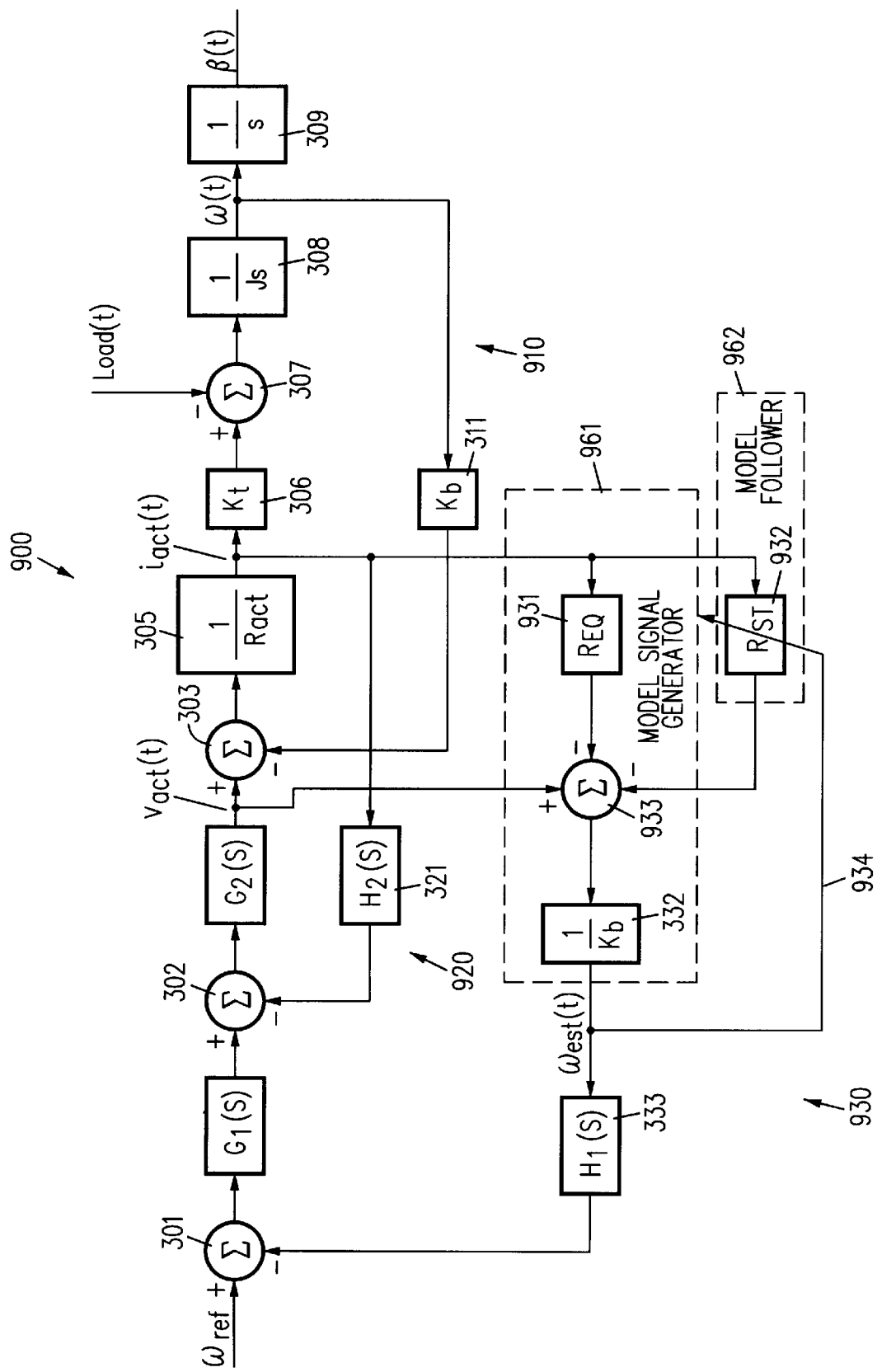
FIG. 9 is an analog embodiment of a velocity-controlled actuator system of this invention that includes a model signal generator and a model follower in a velocity feedback loop.

FIG. 9 is a diagram of a velocity-controlled actuator system 900 that implements expression (3) for the velocity-controlled actuator system voltage signal and expression (5) for the velocity feedback signal, according to the principles of this invention. Components in FIG. 9 that are the same as the components or junctions in FIG. 3 have the same reference numeral. Velocity-controlled actuator system 900 includes three feedback loops: a physical back EMF voltage feedback loop 910 in which the actual angular velocity ω(t) of the actuator is adjusted by a physical back EMF gain Kb; an actuator current feedback loop 920; and a velocity feedback loop 930 that reconstructs the back EMF voltage using the principles of this invention. Loops 910 and 920 are the same as prior art loops 310 and 320 and so the above description of loops 310 and 320 is incorporated herein by reference.

In velocity-controlled actuator system 900, a reference input voltage ωref is applied to the positive terminal of summing junction 301. The output signal of velocity feedback loop 930 is applied to the negative input terminal of summing junction 301. The output signal from summing junction 301 drives a first transfer function G1(s) which in turn drives the positive input terminal of a second summing junction 302.

The negative input terminal of summing junction 302 is driven by the output signal of current feedback loop 920. The output signal from summing junction 302 drives a second transfer function G2(s). Typically, transfer function G2(s) is a voice coil power amplifier integrated circuit. The output signal from transfer function G2(s) drives the positive input terminal of summing junction 303 and a positive input terminal of a summing junction 933 in velocity feedback loop 930.

The output signal from second transfer function G2(s) is actuator voltage Vact(t). The back EMF voltage from back EMF voltage feedback loop 910 drives the negative input terminal of summing junction 303. Actuator voltage Vact(t) from summing junction 303 is across the actuator coil and so actuator voltage Vact(t) divided by the actual actuator resistance Ract to generate actuator current iact(t).

Actuator current iact(t) drives feedback transfer function H2(s) in current feedback loop 920 and the output signal from transfer function H2(s) is the signal on the negative input terminal of summing junction 302. Actuator current iact(t) multiplied by torque constant gain Kt, i.e., the physical torque constant of the actuator, generates a signal representing actuator torque Tact. In addition, actuator current iact(t) drives unit 931 in feedback loop 930.

The actuator torque signal is applied to a positive input terminal of summing junction 307. The actuator load torque signal is applied to the negative terminal of summing junction 307 so that the output signal of summing junction 307 is the difference between the two torques.

The signal representing the difference between the two torques is divided by the product of actuator inertia Jact and Laplace transform variable s in unit 308 to generate angular velocity ω(t). Angular velocity ω(t) is multiplied by back EMF gain Kb in unit 311 to generate back EMF voltage Vbemf that is applied to the negative terminal of summing junction 303. Thus, expression (5) represents feedback loop 310. Also, in unit 309, angular velocity ω(t) is divided by the Laplace transform variable s, i.e., integrated, to obtain angular position signal θ(t).

Unlike prior art system 300 that multiplied actuator current iact(t) by a constant resistance REQ that estimated actuator resistance Ract, velocity feedback loop 930 that includes both a model signal generator 961 and a model follower 962, adjusts the estimation of actuator resistance Ract as function of reconstructed angular velocity ωest(t) and actuator current iact(t) in the generation of the reconstructed back EMF voltage. Specifically, as shown in FIG. 9, actuator current iact(t) is applied to unit 931 that multiples actuator current iact(t) by constant resistance REQ to generate a signal that is applied to a first negative input terminal of summing junction 933 in model signal generator 961.

In addition, actuator current iact(t) is simultaneously applied to a self-tuning unit 932 that generates an angular velocity and current dependent error compensation signal that compensates for the error introduced in the model. In FIG. 9, line 934 is drawn with an arrow across self-tuning unit 932 to indicate that unit 932 is self-tuning based upon reconstructed angular velocity ωest(t) that is the output signal of unit 332. The output signal of self-tuning unit 932 is applied to a second negative input terminal of summing junction 933. A positive terminal of summing junction 933 is driven by the actuator voltage Vact.

The output signal of summing junction 933 is divided by back EMF gain Kb in unit 332 to generate reconstructed angular velocity ωest(t). Thus, according to the principles of this invention, the reconstructed voltage drop across the actuator coil has two components, a steady-state component and a time varying component. The steady-state component is generated by the model signal generator 961 that includes units 931 and 332 and the portion of summing junction 933 that receives actuator voltage Vact and the output signal of unit 931. The time varying component is provided by self-tuning unit 932 that receives actuator current iact(t) and reconstructed angular velocity ωest(t), which is model follower 962.

The self-tuning time varying component of actuator resistance Ract provides robustness to velocity-controlled actuator system 900 in comparison to velocity-controlled actuator system 300. As explained more completely below, self-tuning unit 932 transparently compensates for manufacturing variations, temperature induced variations and aging, for example.

As explained above and incorporated herein by reference, variable resistance $R_{EQ}$ is:

$$R_{EQ}=Ract+R\delta$$

and when this resistance is used to generate reconstructed back EMF voltage Vbest(t), voltage Vbest(t) is:

$$Vbest(t)=Vbemf(t)-R\delta*iact(t)$$

However, with self-tuning unit 932, reconstructed back EMF voltage Vbest(t) becomes:

$$Vbest(t)=Vbemf(t)-(R\delta Rst)*iact(t)$$

To assure that a positive feedback signal, that would cause stability problems, is not generated, an error bound E is defined so that:

$|(R\delta - Rst)| < \epsilon * Ract$

Error bound ∈ defines the accuracy of the reconstructed back EMF voltage. In particular, error bound ∈ is selected so that the reconstructed back EMF voltage has approximately the same characteristics as the actual back EMF voltage including low velocity, high disturbance operations. In one embodiment, error bound ∈ is 0.01.

In the embodiments described more completely below, in the generation of a velocity feedback signal in actuator control system 650, model following system 660 is implemented as a combination of an analog estimator and a digital estimator. The analog estimator, i.e., the model signal generator, is similar to feedback control loop 330 in the prior art system, except the analog estimator of this invention is more precise than feedback control loop 330. The digital estimator provides greater precision in determining the actuator resistance than was possible with the prior art analog systems, and performs the model following function that compensates for the inherent error signal from the analog estimator. Further, the digital estimator preferably is configured so that the number of additional components required to support the digital correction is minimized.

Figure 10:
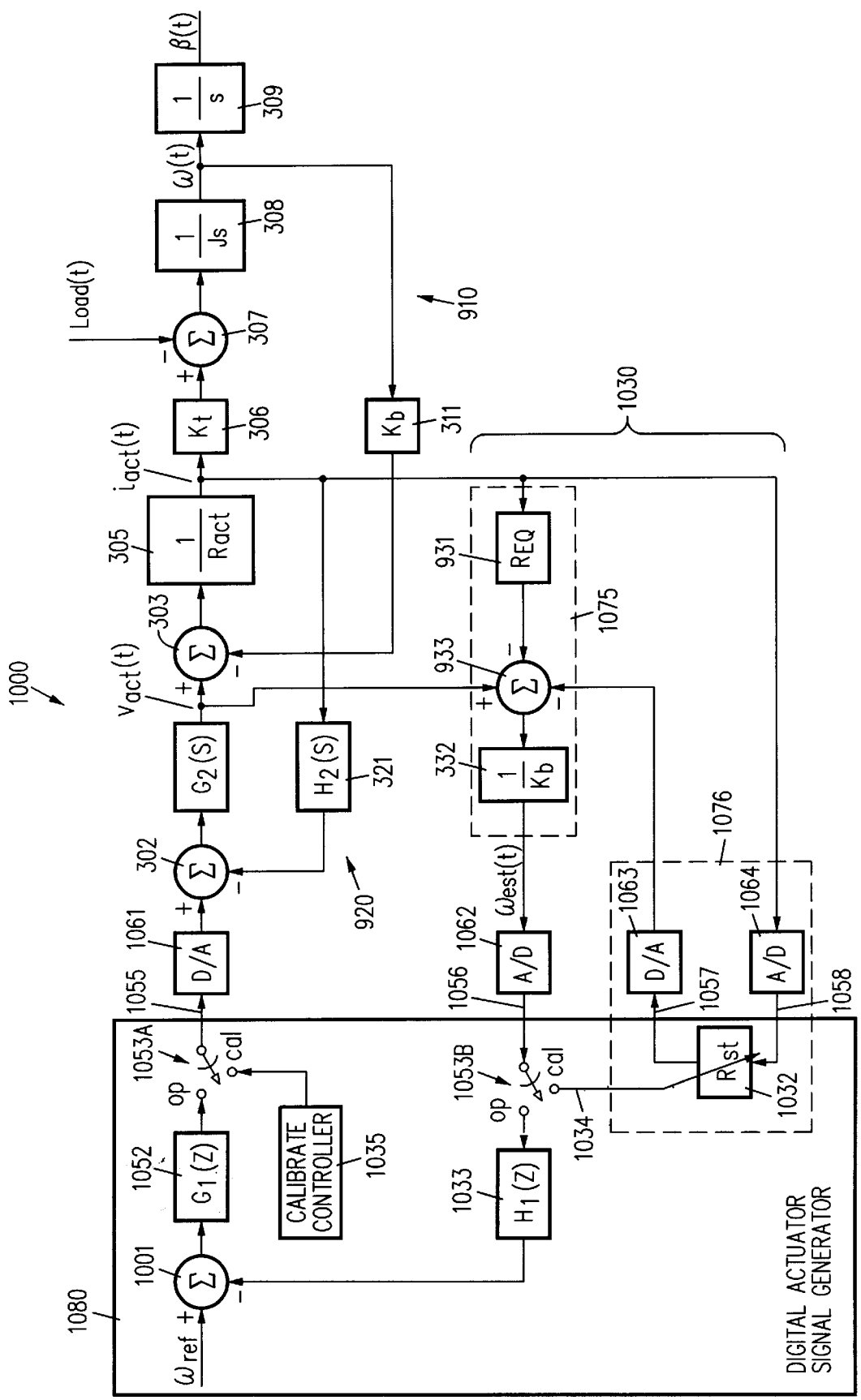
FIG. 10 is an embodiment of a velocity-controlled actuator system of this invention that includes a digital actuator signal, and a velocity feedback loop that has an analog model signal generator and a digital model follower.

FIG. 10 is a more detailed block diagram illustrating another embodiment of the velocity-controlled actuator system of this invention that includes both an analog estimator 1075, i.e, a model signal generator, and a digital estimator 1076, i.e., a model follower, in velocity feedback look 1030. In this embodiment, digital estimator 1076 is implemented using the on-board microprocessor of the disk drive. Specifically, the microprocessor executes firmware to implement a digital velocity controller 1080 that includes digital estimator 1076.

Digital velocity controller 1080, using processes known to those skilled in the art, generates a digital reference angular velocity ωref. Digital reference angular velocity ωref and the digital velocity from velocity feedback loop 1030 are combined by digital velocity controller 1080 in a summing junction 1001 and transfer function G1(z) is applied to the resulting digital voltage in unit 1052. The output voltage from unit 1052 is applied to a first terminal OP, i.e, an operation terminal, of a two pole switch 1053A. While hardware elements are used herein to describe the operation of digital actuator generator 1080, preferably, the equivalent operations are encoded in the disk drive firmware and executed by the disk drive on-board microprocessor.

A second terminal CAL, i.e, a calibration terminal, of two pole switch 1053A is connected to calibration controller 1035 within digital velocity controller 1080. A selector of two pole switch 1053A is connected to a first output line 1055 of digital velocity controller 1080. The operation of switch 1053A is described more completely below.

Output line 1055 drives an input terminal of a digital-to-analog signal converter 1061. In one embodiment, all the digital-to-analog and analog-to-digital converters have an eight-bit resolution. In other embodiments, ten-bit and twelve bit resolutions are utilized.

The analog output signal of converter 1061 drives the plus input terminal of summation junction 302. In FIG. 10, junction 302, forward transfer function G2(s), junction 303, units 305 to 309, unit 311 and unit 321 are configured and operate as described above with respect to FIGS. 3 and 9 and that description is incorporated herein by reference. Similarly, feedback loops 910 and 920 are the same as described above and so the description of loops 910 and 920 is also incorporated herein by reference.

Within velocity feedback loop 1030, unit 931, junction 933, and unit 332 are configured and operate as described above for velocity feedback loop 930, and so unit 332 generates reconstructed angular velocity ωest(t), that in this embodiment drives an input terminal of analog-to-digital converter 1062. The digital output signal of converter 1062 drives a first input line of digital velocity controller 1080 that is connected to a selector of two pole switch 1053B.

In this embodiment, unit 931, junction 933, and unit 332 are analog estimator 1075. Thus, analog estimator 1075 receives three input signals, analog actuator voltage iact(t), analog actuator voltage Vact(t), and an error compensation signal and generates reconstructed angular velocity ωest(t) that is converted to a digital signal.

A first terminal OP, i.e, an operation terminal, of two pole switch 1053B is connected to an input terminal of unit 1033 within digital velocity controller 1080. A second terminal CAL, i.e, a calibration terminal, of two pole switch 1053B is connected to line 1034 which in turn is connected to self-tuning unit 1032 within digital velocity controller 1080.

In this embodiment actuator current iact(t) is applied to an analog-to-digital converter 1064 and the digital output signal of converter 1064 drives a second input line 1058 of digital velocity controller 1080. Second input line 1058 provides the digital current signal to self-tuning unit 1032 within digital velocity controller 1080.

Self-tuning unit 1032 generates a model error compensation signal for the input current signal that compensates for the error introduced in the model by using resistance REQ to approximate the actual time varying actuator resistance Ract. The output signal of self-tuning unit 1032 is driven on a second output line 1057 of digital velocity controller 1080 to a digital-to-analog converter 1063. The analog output signal of converter 1063 is applied to the second negative input terminal of summing junction 933. Thus, in this embodiment, digital estimator 1076 includes digital self-tuning unit 1032, analog-to-digital converter 1064 and digital-to-analog converter 1063.

In this embodiment, resistance REQ is initially adjusted, as in the prior art, so that resistance REQ is an initial estimate of actuator resistance Ract. Next, calibration controller 1035 connects the selector of switches 1053A and 1053B to terminal CAL.

Calibration controller 1035 sequentially generates a series of output voltages. For each output voltage ωrefi, calibration controller 1035 receives the digitized value of reconstructed angular velocity ωest(t) and digitized actuator current iact_i that corresponds to actuator current iact(t) and determines resistance error ΔRi to force reconstructed angular velocity ωest(t) to zero. Using resistance error ΔRi and digitized actuator current iact_i, calibration generator creates a model error compensation voltage δVi. Actuator current iact_i and model error compensation voltage δVi are stored in a table for use during operation. Thus, calibration controller 1035 creates a lookup table where each entry is an actuator current iact_i and the corresponding model error compensation voltage δVi. During this tuning process, the actuator must remain motionless to assure that angular velocity ω(t) is zero. The lookup table is a piece wise linear function representing the self-tuning resistance, and is a piece-wise linear transfer function.

In one embodiment, a new look-up table is generated by calibration controller 1035 prior to each dynamic head loading operation. Thus, since the model error compensation signals utilized in digital self-tuning unit 1032 are continually updated, the model error compensation signals are time dependant and so compensate for manufacturing tolerances, actual operating history of the disk drive and other time dependent physical characteristics of the disk drive that affect the velocity feedback to change. These time dependent factors are no longer considered constant.

After the calibration is complete, calibration controller 1035 returns switches 1053A and 1053B to the operational position. As self-tuning unit 1032 receives digital actuator current iact_j of actuator current iact(t), self-tuning unit 1032 obtains the corresponding model error compensation voltage δVi from the piecewise linear curve f(iact_j) using linear interpolation and outputs the corresponding model error compensation voltage δVi to digital to analog converter 1063.

Figure 11:
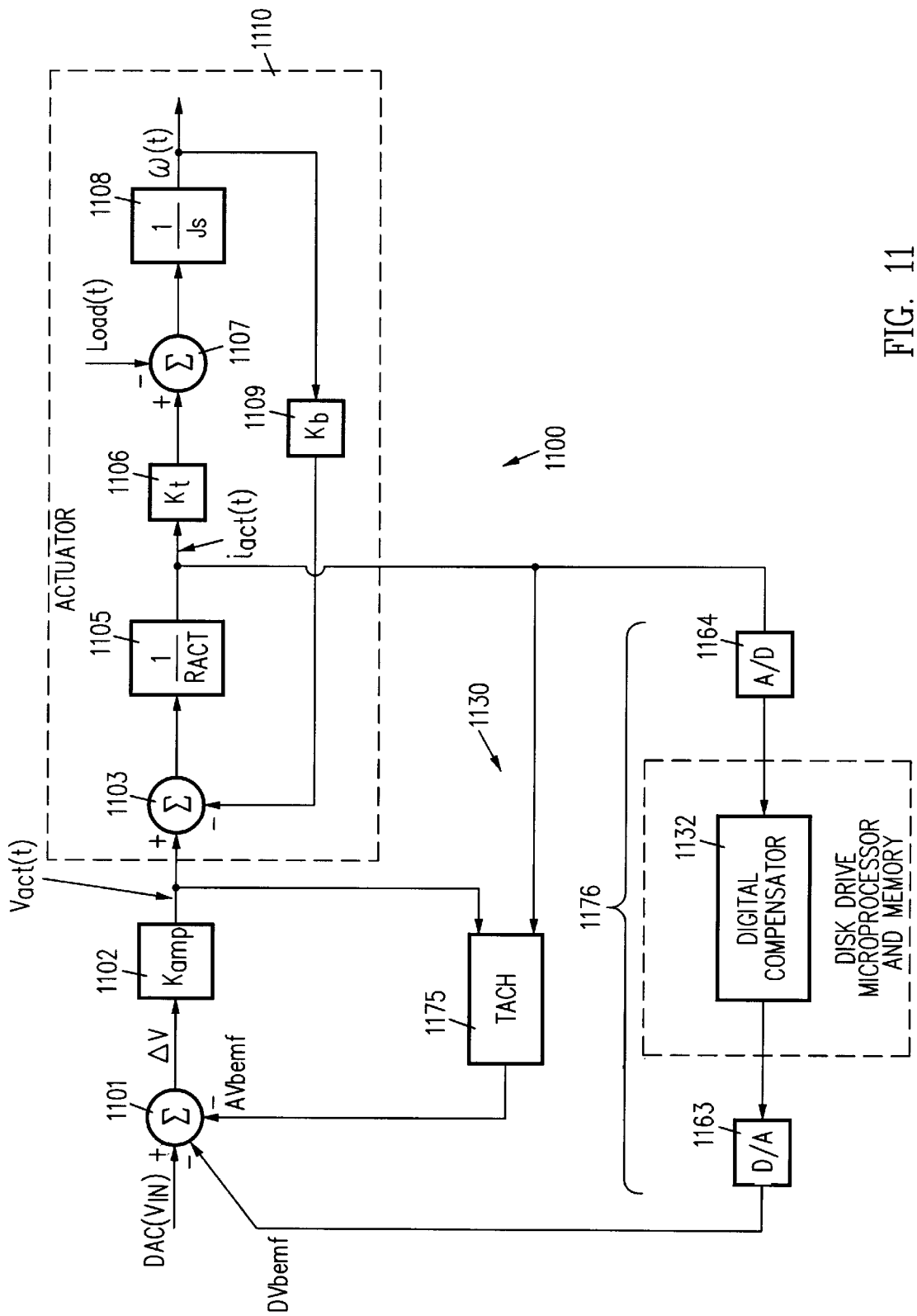
FIG. 11 is another analog velocity-controlled actuator system of this invention that includes a velocity feedback loop that has an analog model signal generator and a digital model follower.

FIG. 11 is a representation of another embodiment of this invention. Actuator velocity-controlled feedback system 1100 includes a velocity-controlled feedback loop 1130 that includes an analog velocity feedback estimator 1175, i.e, a model signal generator, in parallel with a digital velocity feedback compensator 1176, i.e., a model follower. Notice that this configuration is different from that in FIG. 10 where digital estimator 1076 provided an input signal to analog estimator 1075. Also, for convenience, the switches to go from the operation state to the calibration state are not included. However, in view of the embodiment illustrated in FIG. 10, those of skill in the art can include appropriate switches to perform calibration process 1300 that is described more completely below.

Actuator velocity-controlled feedback system 1100 receives an analog voltage, that can be generated by a digital to analog convertor, which can be called voltage Vref that represents reference input voltage ωref on a positive input terminal of summing junction 1101. Analog velocity estimator 1175 generates an analog voltage AVbemf on a first negative input terminal of summing junction 1101, while digital velocity feedback compensator 1176 generates an analog voltage DVbemf on a second negative input terminal of summing junction 1101.

Figure 4:
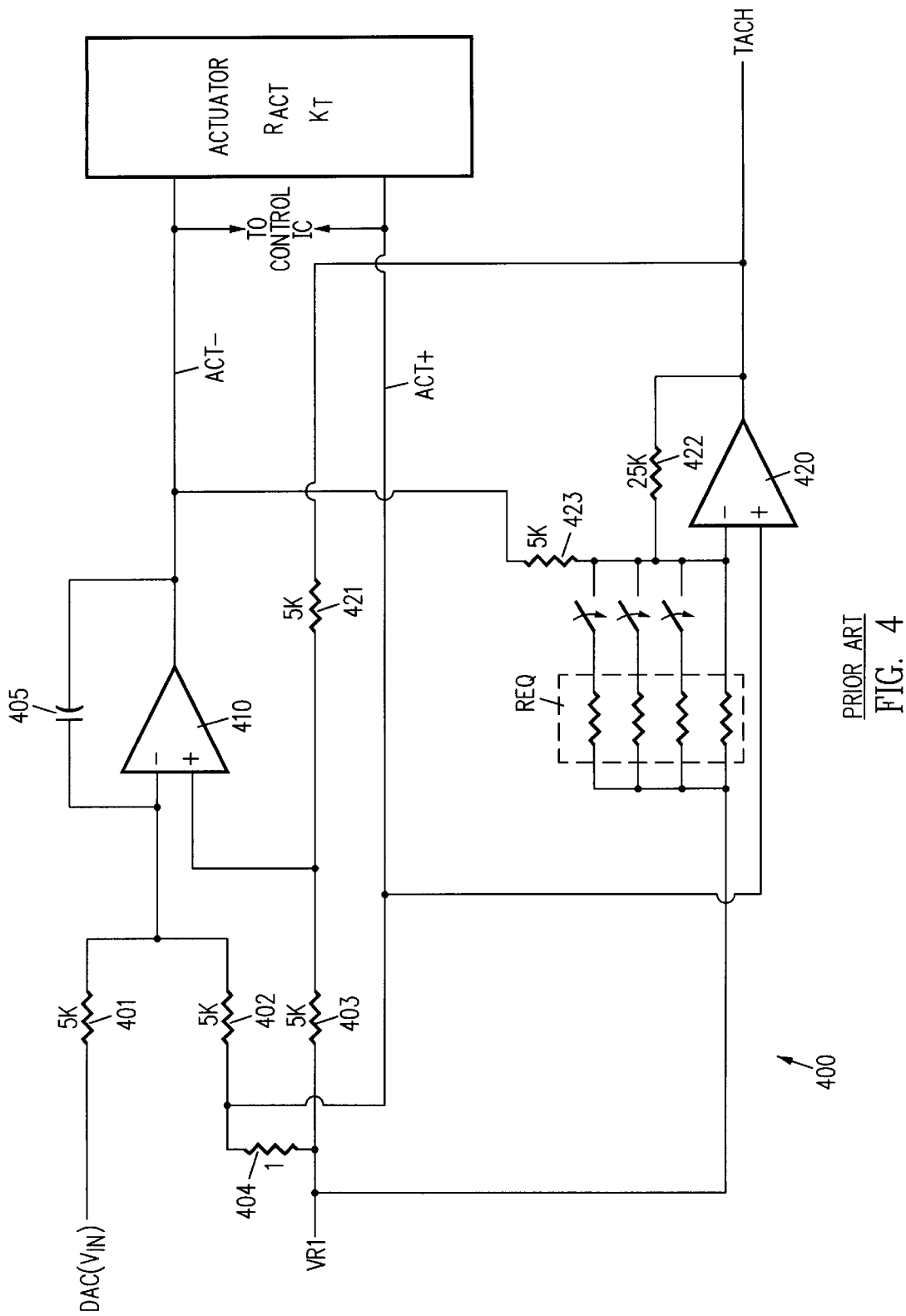
FIG. 4 is a schematic of one prior art embodiment of velocity-controlled actuator circuit that includes a modeled velocity feedback loop.
Figure 5:
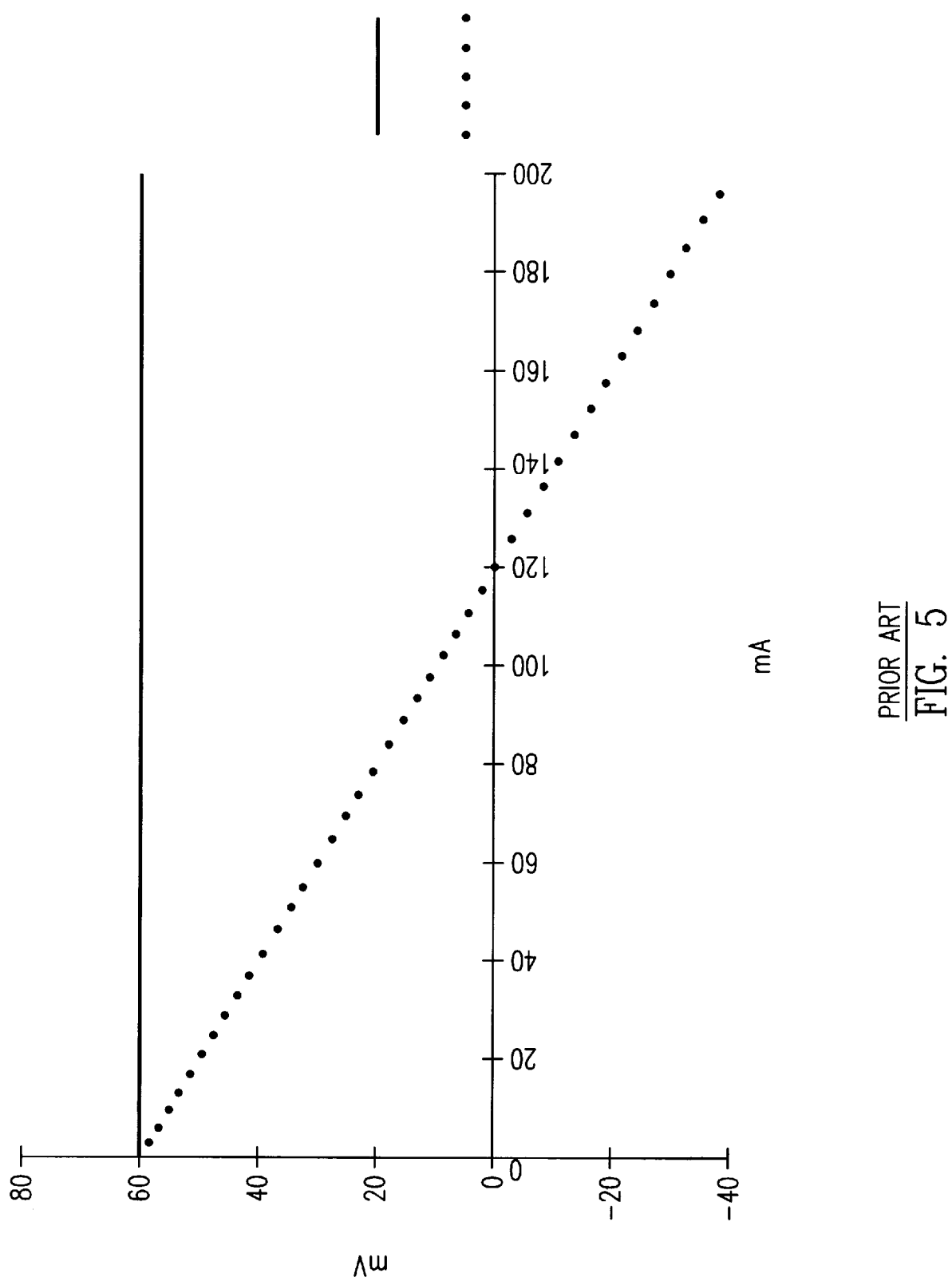
FIG. 5 is a graph that demonstrates the error generated by the modeled velocity feedback loop of FIG. 4 when an abnormal load is encountered.
Figure 6:
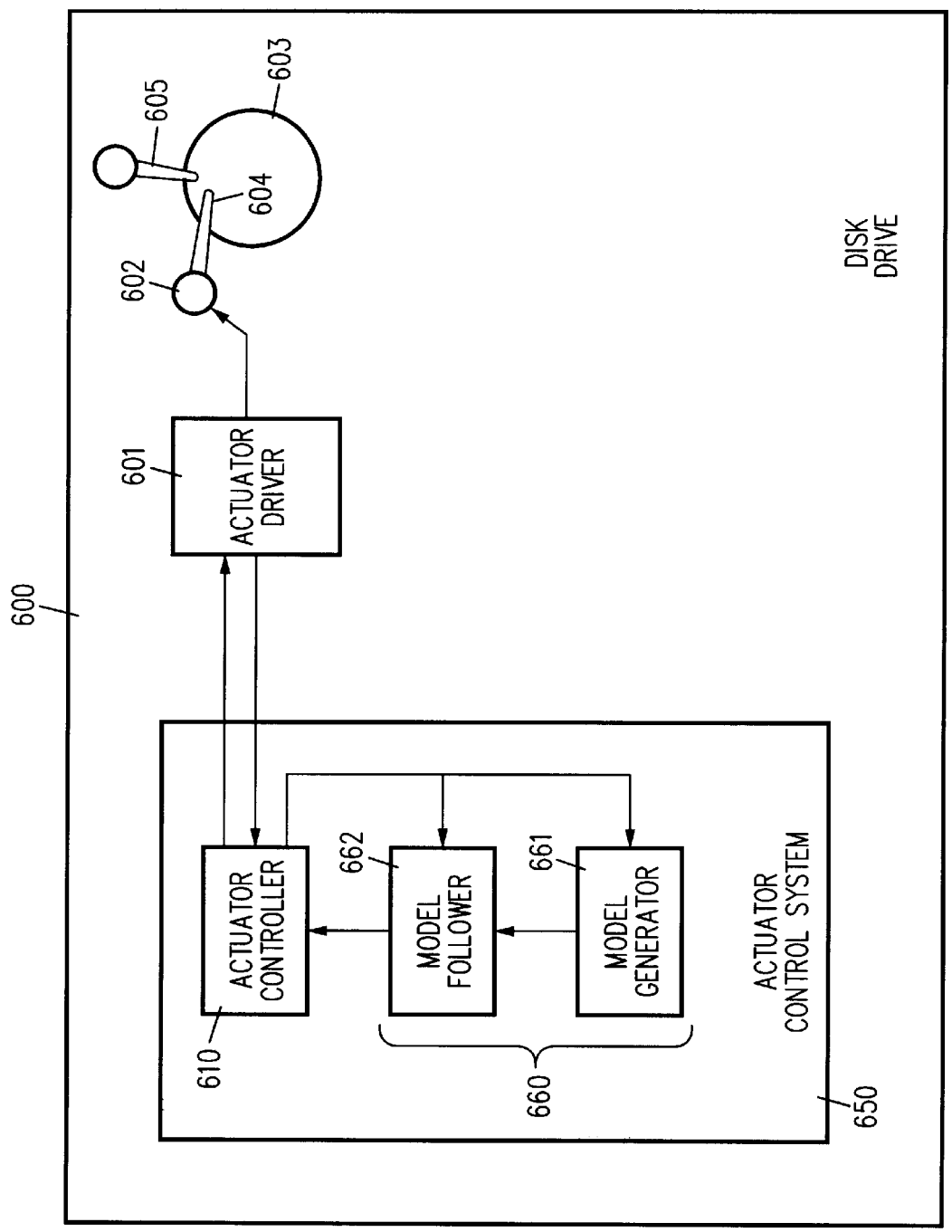
FIG. 6 is a block diagram of a disk drive that includes the novel velocity-controlled actuator system of this invention that includes a model signal generator and a model follower.

Output voltage ΔV from summing junction 1101 is amplified by a gain Kamp in unit 1102, which for example could be the gain of amplifier 410 in FIG. 4, to generate actuator voltage Vact(t) that is applied to actuator 1110. Within actuator 1110, junctions 1103 and 1107 and units 1105, 1106, 1108, and 1109 are similar to junctions 303 and 307 and units 305, 306, 308, and 309, respectively, and so the description of junctions 303 and 307 and units 305, 306, 308, and 309 above is incorporated herein by reference.

Figure 12A:
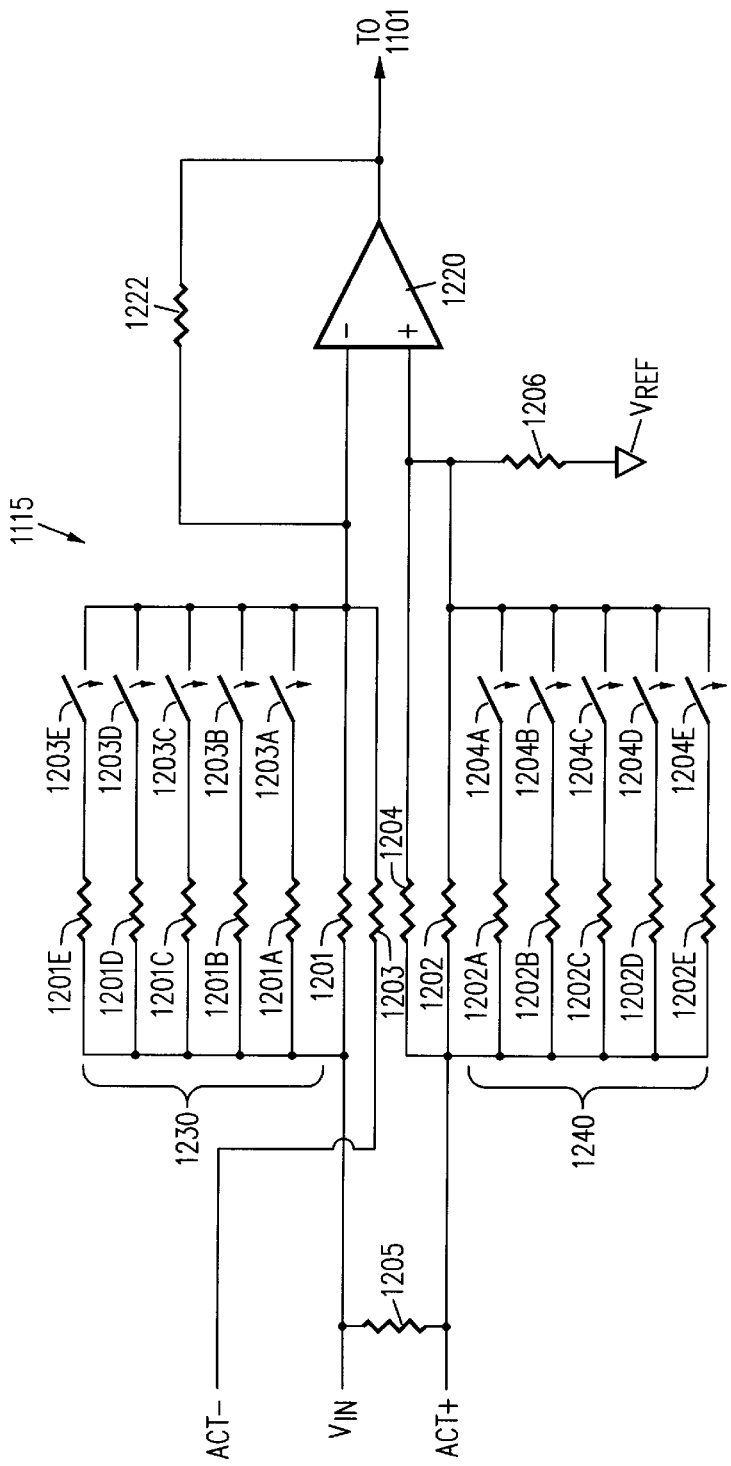
FIG. 12A is a schematic diagram of one embodiment of the analog model signal generator of FIG. 11.
Figure 12B:
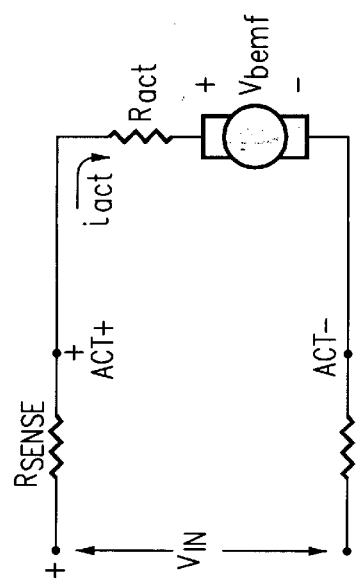
FIG. 12B is an equivalent circuit for the circuit of FIG. 12A.

Actuator voltage Vact(t) and actuator current iact(t) are fed back to analog velocity estimator 1175. FIG. 12A is a more detailed diagram of one embodiment of analog velocity estimator 1175. FIG. 12B is a simplified equivalent diagram of the circuit modeled by the circuit in FIG. 12A that is useful in considering the operation of analog velocity estimator 1175.

Input signals ACT− and ACT+ are similar to those in FIG. 4 in that these signals are across the actuator. Specifically, from FIG. 12B, $$Vbemf=(ACT+)-(ACT-)-iact*Ract$$

and $$iact=(Vin-(ACT-))/Rsense$$

The second expression can be substituted in the first and simplified with resistor Rsense taken as 1 ohm.

Input signal Vin is passed through resistor 1201 to a negative input terminal of operational amplifier 1220. A resistor ladder 1230 is connected in parallel with resistor 1201. In one embodiment, resistance ladder 1230 includes five elements connected in parallel where each element includes a resistor and a switch connected in series. Specifically, resistance ladder 1230 includes resistors 1201A to 1201E and switches 1203A to 1203E.

Input signal ACT− is passed through resistor 1203 to the negative input terminal of operational amplifier 1220. An output terminal of operational amplifier 1220 is connected to the negative input terminal by feedback resistor 1222. The gain of operational amplifier 1220 is selected to generate a signal representative of the back EMF voltage whose magnitude is consistent with reference input voltage coref. For example, assume that the back EMF voltage for a velocity of 2.5 inches/sec is 50 millivolts. For a zero change in voltage and a reference input voltage ωref of one volt, the gain of operational amplifier 1220 is 1.00/0.050 or 20, if no other gain stages are included.

The line carrying signal Vin is connected to the line carrying signal ACT+ by resistor 1205, which in this embodiment is a one ohm resistor. Signal ACT+ is passed through resistor 1203 and 1204, that are connected in parallel, to a positive input terminal of operational amplifier 1220. A resistor ladder 1240 is connected in parallel with resistor 1204. In this embodiment, resistance ladder 1240 includes five elements connected in parallel where each element includes a resistor and a switch connected in series. Specifically, resistance ladder 1240 includes resistors 1202A to 1202E and switches 1204A to 1204E. The positive terminal of operational amplifier 1220 is connected to a reference voltage Vref through resistor 1206.

In this embodiment, the five switches 1203A to 1203E and 1204A to 1204E in each leg of operational amplifier 1220 are independent. Normally, all the switches are open. However, corresponding switches in each leg work are closed in unison to keep the input resistances equivalent. For example, if the parallel combination of resistors 1201 and 1201A is desired, switches 1203A and 1204A are closed.

As explained more completely below, tach circuit 1175 is calibrated, i.e, the switches in the resistance ladders are adjusted so that the output signal of tach circuit 1175 approximates the back EMF voltage as close as possible. The adjustment of the switches defines resistance REQ that is the approximation of the physical actuator resistance in the model signal generator. As those skilled in the art will appreciate, circuit 1175 implements the units and junction in the previous embodiments of the velocity feedback loop of this invention that multiplied actuator current iact(t) by resistance REQ; combined the resulting voltage with actuator voltage Vact(t); and generates the DC gain given by H1 (z)/Kb or H1 (s)/Kb.

Thus, in FIG. 11, tach circuit 1175 generates a modeled estimate of the back EMF voltage. The model follower, i.e, digital velocity feedback compensator 1176, generates a model error compensation signal that compensates for the error in the signal from circuit 1175. Specifically, actuator current iact(t) is converted to a digital signal by analog-to-digital converter 1164.

The digitized current signal is an input signal to digital compensator 1132. In this embodiment, digital compensator 1132 is implemented as a part of the disk drive firmware that is executed by the on-board disk drive microprocessor. In response to the digitized current signal, digital compensator 1132 generates a model error compensation signal corresponding to the digitized current signal using data from a table representing the piecewise linear curve stored in the memory of the disk drive. The model error compensation signal is the output signal from digital compensator 1132 that is supplied to digital-to-analog converter 1163.

Digital-to-analog converter 1163 converts the digital model error compensation signal to analog signal DVbemf that is applied to summing junction 1101. In this embodiment, the look-up table representing the piecewise linear curve used by digital compensator 1132 is periodically updated. Consequently, the model error compensation signals generated using the table reflect the time dependent characteristics of the disk drive that affect the back EMF voltage reconstruction. In addition, the model error compensation signals include compensations for abnormal events such as those encountered in dynamic head loading. Therefore, actuator velocity-controlled feedback system 1100 more precisely reconstructs the time-dependent characteristics of back EMF voltage during normal operations than prior art system, and more precisely controls the actuator velocity during the abnormal events.

Figure 13:
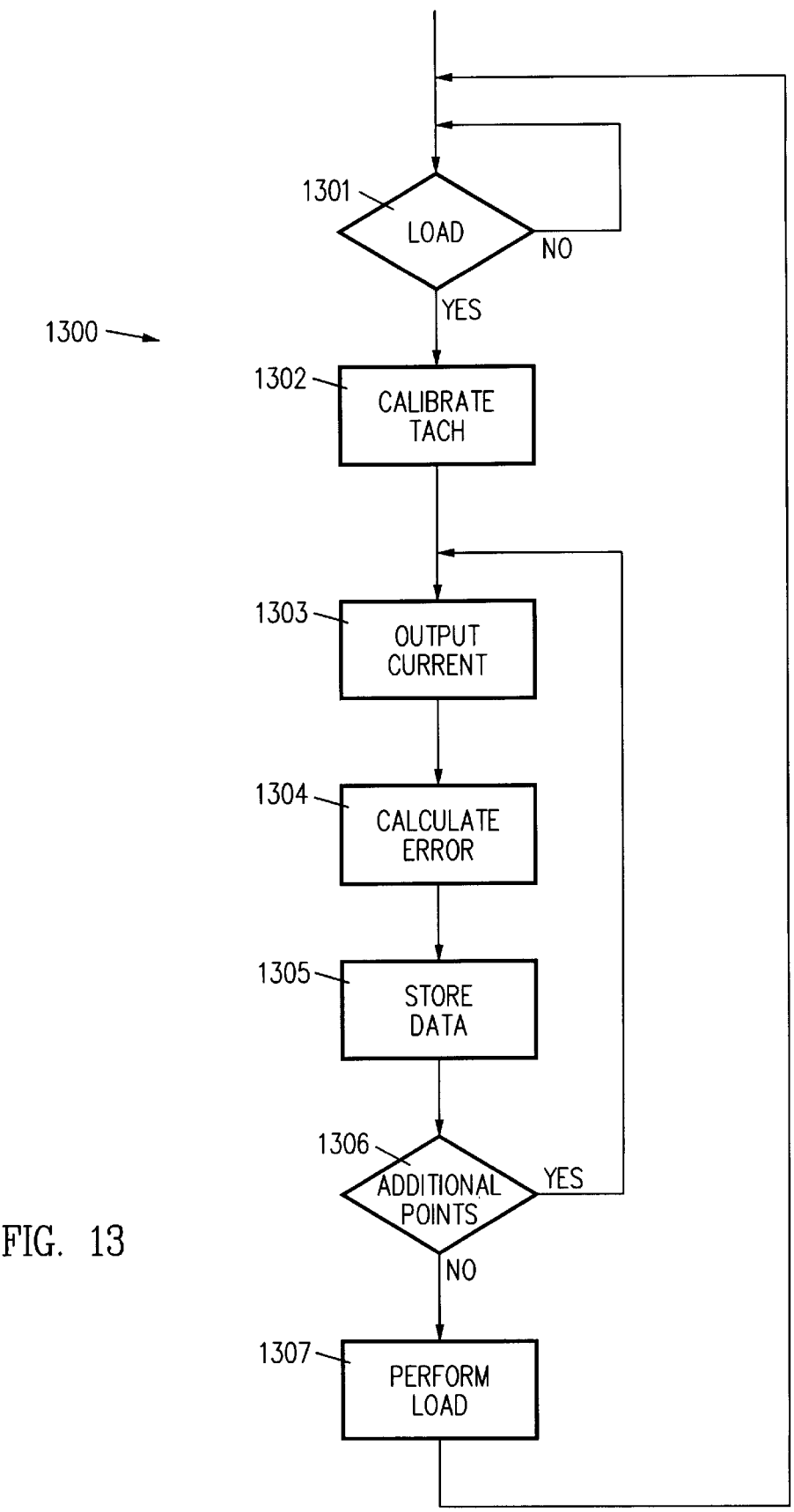
FIG. 13 is a process flow diagram of a calibration process for determining the error signals generated by the digital compensator of FIG. 11.

FIG. 13 is a process flow diagram 1300 for generating the transfer function of the model follower, e,g, the look-up table describing the piecewise linear curve used by digital compensator 1132 in digital velocity feedback compensator 1176. Calibration process 1300 for the model follower is preferably performed prior to each dynamic head load operation.

Thus, in operation of the disk drive, the process of this invention stays in load check process 1302 until a head load operation is initiated. Upon initiation of a head load operation, process 1301 transfers to calibrate tachometer circuit process 1302.

Initially, in calibrate tach process 1302, a predetermined actuator current, e.g., 100 mA, is generated. Next switches 1201A to 1201E and 1202A to 1202E are adjusted, i.e, opened and closed, until signal Avbemf matches signal DAC(Vin) as closely as possible. In this embodiment, the error is about two percent. Since, in this embodiment, calibrate tachometer circuit process 1302 is performed prior to every head load operation, variations introduced by age, temperature, environmental perturbations and similar factors in the tachometer circuit are taken into account.

In generate current process 1303, a predetermined current is generated and the actuator remains stationary. For example, the equivalent of switch 1053 could be positioned in the calibration position to open the velocity feedback loop, and the inner current loop used to apply a known current to the voice motor coil of the actuator. Upon generation of the current, processing transfers to calculate error process 1304.

In calculate error process 1304, output signal AVbemf is measured and the voltage required to generate a zero level feedback signal, i.e., the error compensation signal, is determined for the predetermined current. The error compensation signal is then converted to a digital value so that when the digital value is processed by digital-to-analog converter 1163, signal DVbemf has the level of the error compensation.

Upon determination of the proper digital value of error compensation signal, the predetermined current and the digital value are stored for use in store data process 1305. Upon completion of store data process 1304, processing transfers to additional currents check process 1306. In one embodiment, five currents are generated, −33 mA, 0 mA, 33 mA, 66 mA, and 130 mA. If all the currents have been processed, check 1306 transfers to perform load 1307, and otherwise to generate current process 1303 where the next current is generated and processes 1303 to 1306 repeated. Typically, this calibration process is performed in about 50 milliseconds.

In perform load process 1307, digital compensator 1132, receives the digital actuator current and uses the piece-wise linear curve generated in calibration process 1300 to generate a model error compensation signal for the given input signal. This model error compensation signal is provided to digital analog converter 1163, which in turn generates signal DVbemf. Thus, the table generated is a piece-wise linear function that is used in following the model output during the load operation so that the velocity is properly controlled. In this embodiment, linear interpolation is used within the look-up table to generate the model error compensation signal for a given input signal. This process is performed using the disk drive microprocessor.

Figure 14:
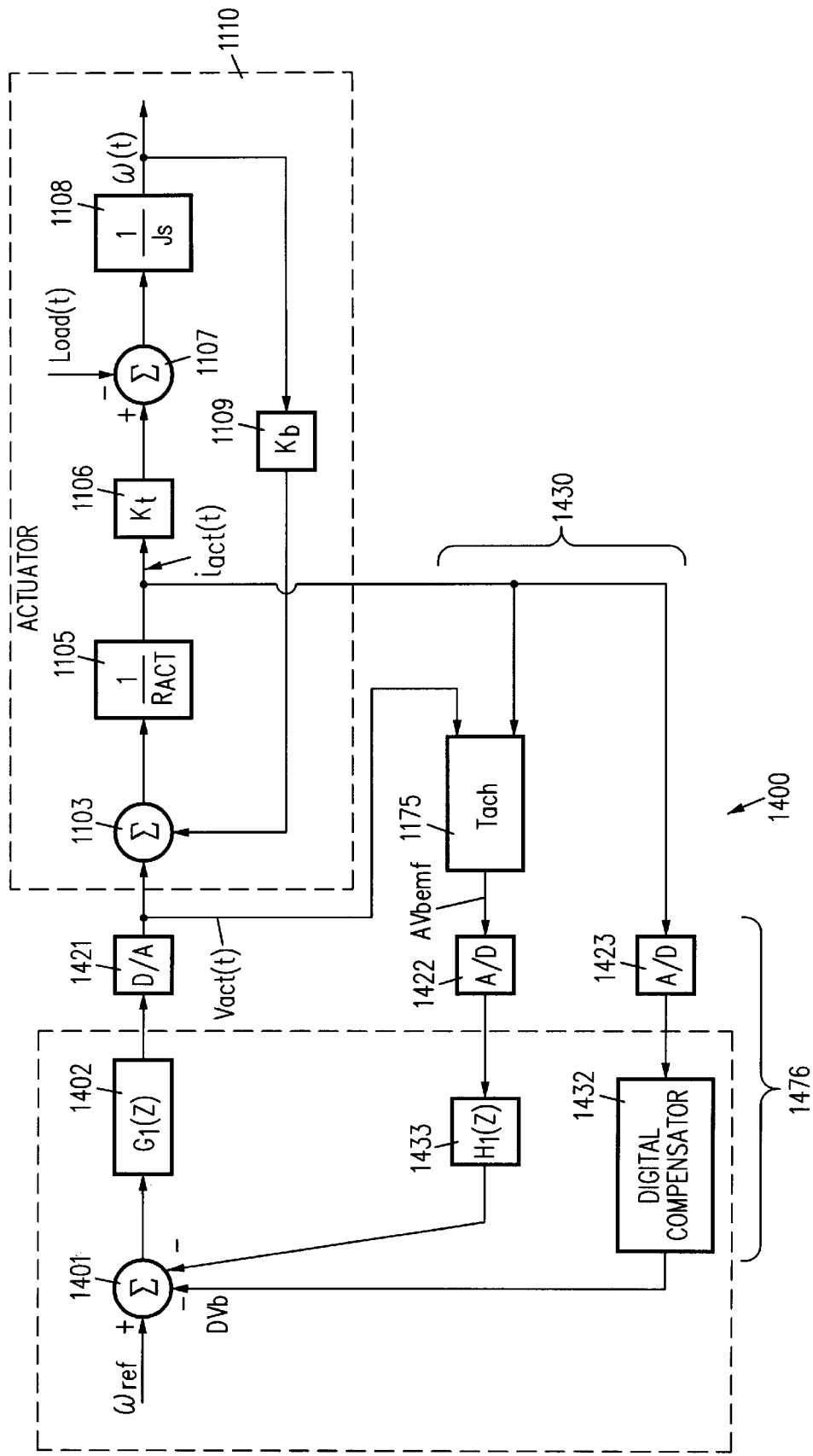
FIG. 14 is another embodiment of a velocity-controlled actuator system of this invention that includes a digital actuator signal, and a velocity feedback loop that has an analog model signal generator and a digital model follower.

FIG. 14 is a representation of yet another embodiment of this invention. Velocity-controlled actuator system 1400 includes a velocity-controlled feedback loop 1430 that includes an analog velocity feedback estimator 1175, i.e, a model signal generator, an analog-to-digital converter 1422, and a unit 1433 with transfer function H1(z) in parallel with a digital velocity feedback compensator 1476, i.e., a model follower. Again, for convenience, the switches to go from the operation state to the calibration state are not included. However, in view of the embodiment illustrated in FIG. 10, those of skill in the art can include appropriate switches to perform calibration process 1500 that is described more completely below.

Velocity-controlled actuator system 1400 receives a digital signal ωref, that is generated using the disk drive microprocessor in a conventional fashion, on a positive input terminal of summing junction 1401. Analog velocity estimator 1175 generates an analog voltage AVbemf that is applied to an analog-to-digital converter 1442. Converter 1442 digitizes analog voltage AVbemf and provides the resulting digital signal to transfer function H1(z) in unit 1433. The digital output signal of unit 1433 is applied to a first negative input terminal of summing junction 1401, while digital velocity feedback compensator 1476 generates an a digital voltage DVb on a second negative input terminal of summing junction 1401.

The output signal from summing junction is processed by transfer function G1(z) in unit 1402 and the resulting digital signal, that is the digital actuator voltage, is applied to digital-to-analog converter 1421. Analog output voltage Vact from converter 1421 is applied to actuator 1110. Within actuator 1110, junctions 1103 and 1107 and units 1105, 1106, 1108, and 1109 are the same as described with respect to FIG. 11 above.

Actuator voltage Vact(t) and actuator current iact(t) are fed back to analog velocity estimator 1175 which generates signal AVbemf, as described above with respect to FIG. 12. Actuator current iact(t) is also applied to analog-to-digital converter 1423 in digital velocity feedback compensator 1476. The resulting digitized current is applied to digital compensator 1432 in digital velocity feedback compensator 1476.

In response to the digitized current, digital compensator 1432 generates a model error compensation signal using stored look-up table. The model error compensation signal is the output signal from digital velocity feedback compensator 1476. The look-up table is generated as explained more completely below.

Figure 15:
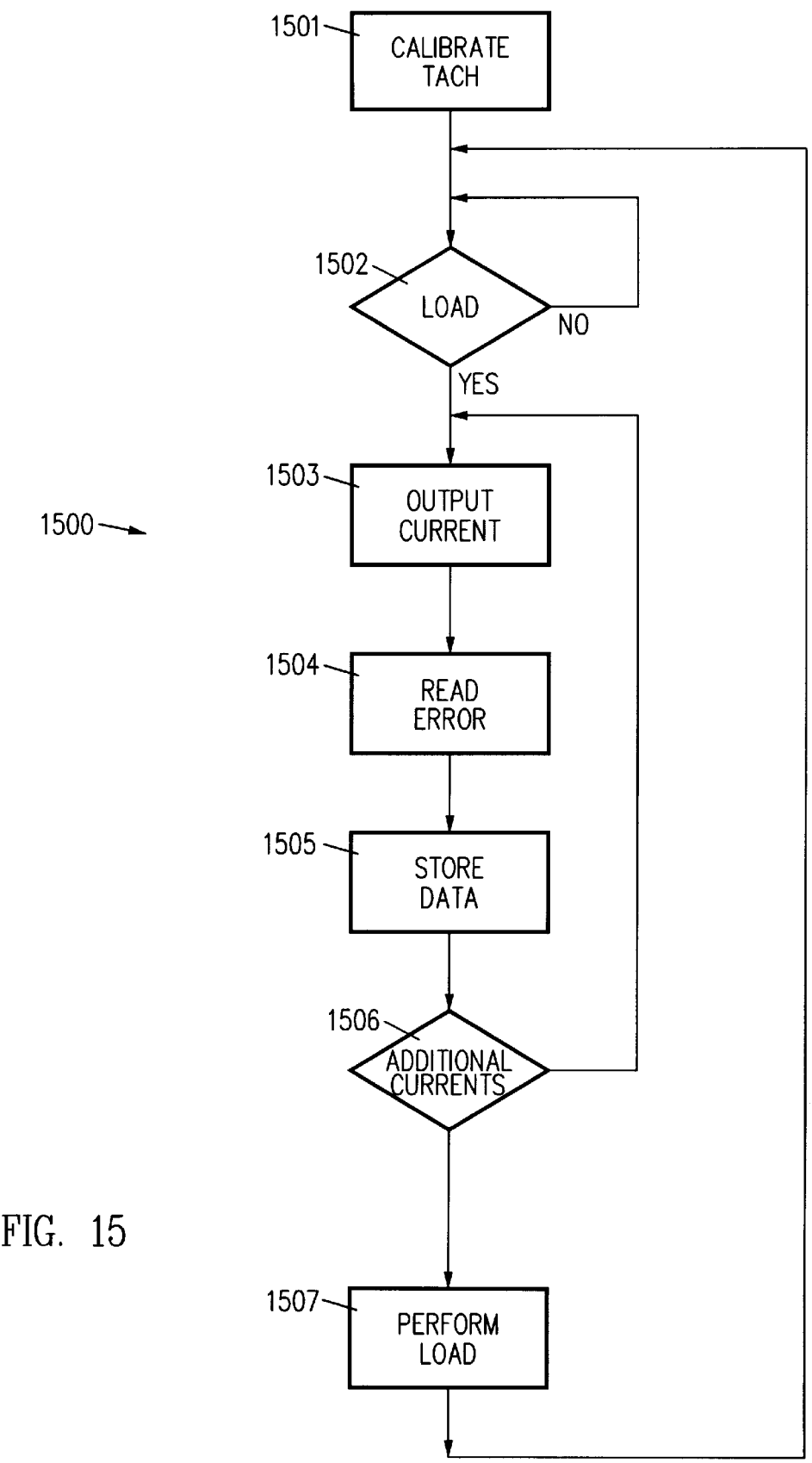
FIG. 15 is a process flow diagram of a calibration process for determining the error signals generated by the digital compensator of FIG. 14.

FIG. 15 is a process flow diagram for generating the transfer function, i.e, the look-up table of the model follower. In this embodiment, calibration process 1500 for the model follower also is preferably performed prior to each head load operation.

Initially, calibrate tachometer circuit process 1501 is the same as calibrate tachometer circuit process 1302 and that description is incorporated herein by reference. However, notice that process 1501 is not within the load loop as in process 1300 and so process 1501 is not performed prior to each load operation.

The placement of the calibrate tachometer circuit process can be varied based upon the operation of this disk drive. Process 1500 could also be implemented in another embodiment with the calibrate tachometer circuit process within the load loop as in process 1300. Alternatively, the calibrate tachometer circuit process could be included within the load loop, but performed only when certain conditions were encountered during operation of the disk drive. The important aspect is to recalibrate the tachometer circuit with sufficient frequency to account for changes in the operating conditions of the actuator system that affect the operation of the tachometer circuit.

In operation of the disk drive, the process of this invention stays in load check process 1502 until a head load operation is initiated. Upon initiation of a head load operation, process 1502 transfers to output current process 1503.

In output current process 1503, a predetermined current is output and the actuator remains stationary. Upon generation of the current, as described above, for example, processing transfers to read error process 1504.

In read error process 1504, the output signal of transfer function H1(z) of unit 1433 is read and the digitized current from converter 1423 is read. The output signal of transfer function H1(z) should be zero, and so the signal that is read is the error signal. Notice that here, the output signal itself is taken as the error signal and so it is unnecessary to calculate the error signal as in calibration process 1300. Thus, this implementation requires less time and consequently less heat-up of the actuator during calibration process 1500.

Upon reading the two digital values, the digitized current and the model error compensation signal are stored for use in store data process 1505. Upon completion of store data process 1504, processing transfers to additional currents check process 1506. In one embodiment, five currents are utilized, −33 mA, 0 mA, 33 mA, 66 mA, and 130 mA. If all the currents have been processed, check 1506 transfers to perform load operation 1507, and otherwise to generated current process 1503 where the next current is generated and processes 1503 to 1506 repeated.

When the data for all five currents are stored, a piecewise linear table of current versus model error compensation signal are stored in a memory accessible by the disk drive microprocessor. In perform load operation 1507, the disk drive microprocessor uses linear interpolation to generate a model error compensation signal.

For example, assume that for a first current, the digitized current Ii, is between currents I2 and I3 in the stored look-up table. Model error compensation signal H2 is stored with current I2 and model error compensation signal H3 is stored with current I3.

Thus, to generate a model error compensation signal ERROR(Ii) for current Ii, perform load operation 1508 uses the stored data for currents of I2 and I3, i.e,.

$$ERROR(Ii)=I2+((H3-H2)/(I3-I2))*(Ii-I2)$$

In this embodiment, model error compensation signal ERROR(Ii) is feedback signal DVb.

The method of FIG. 15 reduces the calibration time relative the embodiment of FIG. 13, does not heat up the actuator causing the resistance to change, and is easier to implement than the analog method of FIG. 13.

In the various embodiments of this invention, a method and structure has been described that eliminates the shortcomings of prior art velocity-controlled actuator systems that reconstructed a back EMF voltage for both normal and abnormal operations. The use of a model signal generator to reconstruct a portion of the back EMF voltage that uses time independent parameters and a model follower that generates an error compensation signal that incorporates the variation of the disk drive parameters over time provides robustness to the velocity-controlled actuator system of this invention. The model follower transparently compensates for manufacturing variations, temperature induced variations and aging, for example. The various embodiments described herein are illustrative only of the principles of this invention and are not intended to limit the invention to the particular implementations described. Those skilled in the art will be able use the principles of this invention in any application with a velocity-controlled feedback loop or any application with a feedback loop that can be modeled and a model follower defined to correct the signals from the model.

I claim:

1. In a disk drive, a velocity-controlled actuator system comprising:
    an actuator signal line;
    a model velocity signal generator connected to said actuator signal line;
        wherein said model velocity signal generator comprises a back EMF model signal generator;
        wherein said velocity model signal generator receives a signal on said actuator signal line as an input signal; and
        in response to said input signal generates a model feedback signal; and
    a model follower connected to said actuator signal line;
        wherein said model follower receives as an input signal said signal on said actuator signal line; and
        in response to said input signal, generates a model error compensation signal so that upon combination of said model feedback signal and said model error compensation signal, a feedback signal is generated for use in control of said disk drive.

2. In a disk drive, a velocity-controlled actuator system as in claim 1 wherein said model follower further comprises a digital model follower.

3. In a disk drive, a velocity-controlled actuator system as in claim 1 wherein digital model follower further comprises:
    a digital compensator coupled to said actuator signal line.

4. In a disk drive, a velocity-controlled actuator system as in claim 3 wherein digital model follower further comprises:
    an analog-to-digital converter connected to said actuator signal line and coupled to an input line of said digital compensator.

5. In a disk drive, a velocity-controlled actuator system as in claim 1 wherein said digital model follower further comprises:
    a digital-to-analog converter coupled to an input line of said digital compensator, and coupled to a control system of said velocity-controlled actuator system.

* * * * *